US009886655B2

(12) United States Patent
Kayanaka

(10) Patent No.: US 9,886,655 B2
(45) Date of Patent: Feb. 6, 2018

(54) IMAGE FORMATION DEVICE AND NON-TRANSITORY COMPUTER-READABLE MEDIUM

(71) Applicant: BROTHER KOGYO KABUSHIKI KAISHA, Nagoya-shi, Aichi-ken (JP)

(72) Inventor: Yoshihisa Kayanaka, Kuwana (JP)

(73) Assignee: BROTHER KOGYO KABUSHIKI KAISHA, Nagoya-shi (JP)

( * ) Notice: Subject to any disclaimer, the term of this patent is extended or adjusted under 35 U.S.C. 154(b) by 0 days.

(21) Appl. No.: 15/274,631

(22) Filed: Sep. 23, 2016

(65) Prior Publication Data
US 2017/0087822 A1 Mar. 30, 2017

(30) Foreign Application Priority Data
Sep. 30, 2015 (JP) .................................. 2015-193880

(51) Int. Cl.
*G06K 15/10* (2006.01)
*B41J 2/36* (2006.01)
*B41J 2/045* (2006.01)
*B41J 2/21* (2006.01)

(52) U.S. Cl.
CPC ........ *G06K 15/107* (2013.01); *B41J 2/04508* (2013.01); *B41J 2/04586* (2013.01); *B41J 2/2117* (2013.01); *B41J 2/2132* (2013.01); *B41J 2/36* (2013.01)

(58) Field of Classification Search
CPC ... B41J 2/36; B41J 2/362; B41J 2/2132; B41J 2/2139; B41J 2/04508; G06K 15/102; G06K 15/105; G06K 15/107
See application file for complete search history.

(56) References Cited

U.S. PATENT DOCUMENTS

| | | | | |
|---|---|---|---|---|
| 2013/0194334 A1* | 8/2013 | Watanabe | ............... | B41J 2/2117 347/12 |
| 2013/0278660 A1* | 10/2013 | Tsuji | ...................... | B41J 2/2117 347/14 |
| 2014/0085366 A1* | 3/2014 | Mori | .......................... | B41J 2/07 347/12 |

FOREIGN PATENT DOCUMENTS

JP 2013-154511 A 8/2013

\* cited by examiner

*Primary Examiner* — Sharon A Polk
(74) *Attorney, Agent, or Firm* — K&L Gates LLP

(57) ABSTRACT

Provided is the image formation device which suppresses an occurrence of unevenness in density of the image and a time required to form the image. The image formation device forms images by moving the different ejection heads. One of the ejection heads ejects white ink from a first predetermined number of nozzles thereof. Another one of the ejection heads ejects color ink from the first predetermined number and a second predetermined number of nozzles thereof. The ejection heads that eject color ink move in a sub scan direction that is non-integral multiple of a distance between the adjacent nozzle holes and eject the color ink, and then move in the sub scan direction that corresponds to a length in the sub scan direction of an area of the ejection head in which the first predetermined number of the nozzles are arranged and eject the color ink.

13 Claims, 18 Drawing Sheets

FIG. 6

| HEADER INFORMATION | | | | | | |
|---|---|---|---|---|---|---|
| | 421 | | | | | |
| | RESOLUTION | | | | | |
| | PLATEN INFORMATION | | | | | |
| | PRINT METHOD SPECIFICATION INFORMATION | | | | | |
| | IMAGE ROW NUMBER | COLOR INFORMATION | LEFT MARGIN | RIGHT MARGIN | RASTER DATA | |
| RASTER INFORMATION | 1 | WHITE 1 | ... | ... | 1 1 1 1 1 1 1 1 1 1 ... 1 1 1 1 1 1 1 | |
| | | WHITE 2 | ... | ... | 1 1 1 1 1 1 1 1 1 1 ... 1 1 1 1 1 1 1 | |
| | | WHITE 3 | ... | ... | 1 1 1 1 1 1 1 1 1 1 ... 1 1 1 1 1 1 1 | |
| | | WHITE 4 | ... | ... | 1 1 1 1 1 1 1 1 1 1 ... 1 1 1 1 1 1 1 | |
| | | CYAN | ... | ... | 1 1 1 1 1 1 1 1 1 1 ... 1 1 1 1 1 1 1 | |
| | | MAGENTA | ... | ... | 1 1 1 1 1 1 1 1 1 1 ... 1 1 1 1 1 1 1 | |
| | | YELLOW | ... | ... | 1 1 1 1 1 1 1 1 1 1 ... 1 1 1 1 1 1 1 | |
| | | BLACK | ... | ... | 1 1 1 1 1 1 1 1 1 1 ... 1 1 1 1 1 1 1 | |
| | 2 | WHITE 1 | ... | ... | 1 1 1 1 1 1 1 1 1 1 ... 1 1 1 1 1 1 1 | |
| | | WHITE 2 | ... | ... | 1 1 1 1 1 1 1 1 1 1 ... 1 1 1 1 1 1 1 | |
| | | WHITE 3 | ... | ... | 1 1 1 1 1 1 1 1 1 1 ... 1 1 1 1 1 1 1 | |
| | | WHITE 4 | ... | ... | 1 1 1 1 1 1 1 1 1 1 ... 1 1 1 1 1 1 1 | |
| | | CYAN | ... | ... | 1 1 1 1 1 1 1 1 1 1 ... 1 1 1 1 1 1 1 | |
| | | MAGENTA | ... | ... | 1 1 1 1 1 1 1 1 1 1 ... 1 1 1 1 1 1 1 | |
| | | YELLOW | ... | ... | 1 1 1 1 1 1 1 1 1 1 ... 1 1 1 1 1 1 1 | |
| | | BLACK | ... | ... | 1 1 1 1 1 1 1 1 1 1 ... 1 1 1 1 1 1 1 | |
| | ... | ... | ... | ... | ... | |
| FOOTER INFORMATION | | | | | | |

FIG. 10

| HEAD TYPE | NOZZLE | POINTER |
|---|---|---|
| WHITE 1 | NOZZLE[1] | 1 |
| | NOZZLE[2] | 5 |
| | : | : |
| | NOZZLE[420] | 1677 |
| WHITE 2 | NOZZLE[1] | 1 |
| | NOZZLE[2] | 5 |
| | : | : |
| | NOZZLE[420] | 1677 |
| WHITE 3 | NOZZLE[1] | 1 |
| | NOZZLE[2] | 5 |
| | : | : |
| | NOZZLE[420] | 1677 |
| WHITE 4 | NOZZLE[1] | 1 |
| | NOZZLE[2] | 5 |
| | : | : |
| | NOZZLE[420] | 1677 |
| CYAN | NOZZLE[1] | 8766 |
| | NOZZLE[2] | 8770 |
| | : | : |
| | NOZZLE[420] | 17528 |
| MAGENTA | NOZZLE[1] | 8766 |
| | NOZZLE[2] | 8770 |
| | : | : |
| | NOZZLE[420] | 17528 |
| YELLOW | NOZZLE[1] | 8766 |
| | NOZZLE[2] | 8770 |
| | : | : |
| | NOZZLE[420] | 17528 |
| BLACK | NOZZLE[1] | 8766 |
| | NOZZLE[2] | 8770 |
| | : | : |
| | NOZZLE[420] | 17528 |

| RESOLUTION | PRESENCE/ABSENCE OF WHITE INFORMATION | LF VALUE | | | |
|---|---|---|---|---|---|
| | | REMAINDER AFTER DIVIDING Cnt BY 4 | | | |
| | | 1 | 2 | 3 | 0 |
| 1200dpi | PRESENCE | 359 | 359 | 359 | 363 |
| | ABSENCE | 419 | 419 | 419 | 423 |

FIG. 16

| STAGE | BITS OF RASTER DATA ||||||||||||||||
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| 1 | 1 | 0 | 0 | 0 | 0 | 0 | 0 | 0 | 0 | 0 | 0 | 0 | 0 | 0 | 0 | 0 |
| 2 | 0 | 0 | 1 | 0 | 0 | 0 | 0 | 0 | 0 | 0 | 1 | 0 | 0 | 0 | 0 | 0 |
| 3 | 0 | 0 | 0 | 0 | 1 | 0 | 0 | 0 | 0 | 1 | 0 | 0 | 0 | 0 | 1 | 0 |
| 4 | 0 | 0 | 0 | 1 | 0 | 0 | 0 | 1 | 0 | 0 | 0 | 1 | 0 | 0 | 0 | 1 |
| 5 | 0 | 0 | 1 | 0 | 0 | 1 | 0 | 0 | 1 | 0 | 0 | 1 | 0 | 0 | 1 | 0 |
| 6 | 0 | 0 | 1 | 0 | 1 | 0 | 0 | 1 | 0 | 1 | 0 | 0 | 1 | 0 | 1 | 0 |
| 7 | 0 | 1 | 0 | 1 | 0 | 1 | 0 | 1 | 0 | 0 | 0 | 1 | 0 | 1 | 0 | 1 |
| 8 | 0 | 1 | 0 | 1 | 0 | 1 | 0 | 1 | 0 | 1 | 0 | 1 | 0 | 1 | 0 | 1 |

IMAGE FORMATION DEVICE AND NON-TRANSITORY COMPUTER-READABLE MEDIUM

CROSS-REFERENCE TO RELATED APPLICATION

This application claims priority to Japanese Patent Application No. 2015-193880 filed on Sep. 30, 2015, the disclosure of which is herein incorporated by reference in its entirety.

BACKGROUND

The present disclosure relates to an image formation device, and a non-transitory computer-readable medium.

An image formation device forms a pixel array formed of a plurality of ink dots aligned in a main scan direction, by ejecting ink from the nozzles while causing the relative movement of the nozzles in the main scan direction with respect to a print medium. The image formation device forms the image on the print medium by forming a plurality of the pixel arrays arranged in the sub scan direction while causing the relative movement of the nozzles in the sub scan direction with respect to the print medium.

A multi-pass method is known in which formation of a single pixel array is completed by a plurality of main scans. For example, there is a multi-pass method, which is a method to complete printing of each of the pixel arrays by causing different nozzles, among a plurality of nozzles provided in an ink head, to perform a scan of the same pixel array.

SUMMARY

In a carriage having the same number of white ink nozzles and color ink nozzles aligned in the sub scan direction, there is a case in which the number of nozzles for ejecting white ink (hereinafter referred to as a "first number") and the number of nozzles for ejecting color inks (hereinafter referred to as a "second number") are different. For example, of the plurality of white ink nozzles, when some of the nozzles cannot be used due to clogging, the first number becomes smaller than the second number. Further, in contrast to the above-described carriage, there is a case in which the number of white ink nozzles and the number of color ink nozzles are different. A white ink image functions as a base for printing a color ink image. Thus, normally, the print device controls an amount of the relative movement of the carriage in the sub scan direction with respect to the cloth on the basis of the first number, such that the white ink pixel arrays are formed while being aligned evenly in the sub scan direction.

In the above-described case, when the second number is larger than the first number, it is possible that some of the pixel arrays of the color ink image may be ejected in an overlapping manner. Thus, there is a possibility that an unevenness in the density of the color ink image may occur. On the other hand, when the second number is smaller than the first number, it is possible that some of the pixel arrays of the color ink image may not be formed. Further, when the second number is smaller than the first number, when a number of main scans is increased to prevent some of the color ink pixel arrays from not being formed, the time required to complete the printing becomes longer than a case in which the number of main scans is not increased.

It is an object of the present disclosure to provide an image formation device, which is an image formation device having a first ink nozzle and a second ink nozzle, and a non-transitory computer-readable medium storing an image formation program that are capable of suppressing the occurrence of unevenness in density of a second ink image and inhibiting the time required to form an image from becoming longer.

Various exemplary embodiments of the general principles described herein provide an image formation device including a head provided with a plurality of first nozzle holes configured to eject a first ink, and a plurality of second nozzle holes configured to eject a second ink. The plurality of second nozzle holes are arranged to a side in the sub scan direction with respect to the plurality of first nozzle holes. The head is configured to form a first ink image and a second ink image on a print medium, by moving relative to the print medium in a main scan direction, ejecting the first ink from the plurality of first nozzle holes, ejecting the second ink from the plurality of second nozzle holes, and moving relative to the print medium in the sub scan direction. The main scan direction is orthogonal to the sub scan direction. The image formation device also includes a processor and a memory storing computer-readable instructions. The computer-readable instructions causes the processor to perform processes including first ejection processing, first movement processing, second ejection processing, second movement processing, and third ejection processing. The first ejection processing ejects the first ink from a first predetermined number of the first nozzle holes and the second ink from the first predetermined number and a second predetermined number of the second nozzle holes while relatively moving the head in the main scan direction. The first movement processing relatively moves the head in the sub scan direction by a first distance from a position of the head at a time of completing the first ejection processing. The first distance is a non-integral multiple of a distance between the adjacent first nozzle holes. After the first movement processing, the second ejection processing ejects the second ink from the first predetermined number and the second predetermined number of the second nozzle holes while relative moving the head in the main scan direction. After the second ejection processing, the second movement processing relatively moves the head in the sub scan direction by a second distance from the position of the head at the time of completing the first ejection processing. The second distance is a length in the sub scan direction of a section over which the first predetermined number of the first nozzle holes are arranged. After the second movement processing, the third ejection processing ejects the first ink from the first predetermined number of the first nozzle holes and the second ink from the first predetermined number and the second predetermined number of the second nozzle holes while relatively moving the head in the main scan direction. An added amount is obtained by adding an ink amount of the second ink ejected onto a first common position in the third ejection processing to an ink amount of the second ink ejected onto the first common position in the first ejection processing. The added amount corresponds to an ink amount of the second ink ejected in the second ejection processing. The first common position is a position at which an ejection position of the second ink in the first ejection processing and an ejection position of the second ink in the third ejection processing are common in the sub scan direction.

Exemplary embodiments herein provide a non-transitory computer-readable medium storing computer-readable instructions. When executed by the processor provided in the image formation device, the computer-readable instructions perform processes including first ejection processing, first movement processing, second ejection processing, second movement processing, and third ejection processing. The first ejection processing ejects the first ink from a first predetermined number of the first nozzle holes and the second ink from the first predetermined number and a second predetermined number of the second nozzle holes while relatively moving the head in the main scan direction. The first movement processing relatively moves the head in the sub scan direction by a first distance from a position of the head at a time of completing the first ejection processing. The first distance is a non-integral multiple of a distance between the adjacent first nozzle holes. After the first movement processing, the second ejection processing ejects the second ink from the first predetermined number and the second predetermined number of the second nozzle holes while relative moving the head in the main scan direction. After the second ejection processing, the second movement processing relatively moves the head in the sub scan direction by a second distance from the position of the head at the time of completing the first ejection processing. The second distance is a length in the sub scan direction of a section over which the first predetermined number of the first nozzle holes are arranged. After the second movement processing, the third ejection processing ejects the first ink from the first predetermined number of the first nozzle holes and the second ink from the first predetermined number and the second predetermined number of the second nozzle holes while relatively moving the head in the main scan direction. An added amount is obtained by adding an ink amount of the second ink ejected onto a first common position in the third ejection processing to an ink amount of the second ink ejected onto the first common position in the first ejection processing. The added amount corresponds to an ink amount of the second ink ejected in the second ejection processing. The first common position is a position at which an ejection position of the second ink in the first ejection processing and an ejection position of the second ink in the third ejection processing are common in the sub scan direction.

BRIEF DESCRIPTION OF THE DRAWINGS

Embodiments will be described below in detail with reference to the accompanying drawings in which:

FIG. 6 is a diagram showing print data;

FIG. 10 is diagram showing a master pointer table;

FIG. 13 is a diagram showing an LF value table;

FIG. 16 is a diagram showing a master mask table;

DETAILED DESCRIPTION

Figure 1:
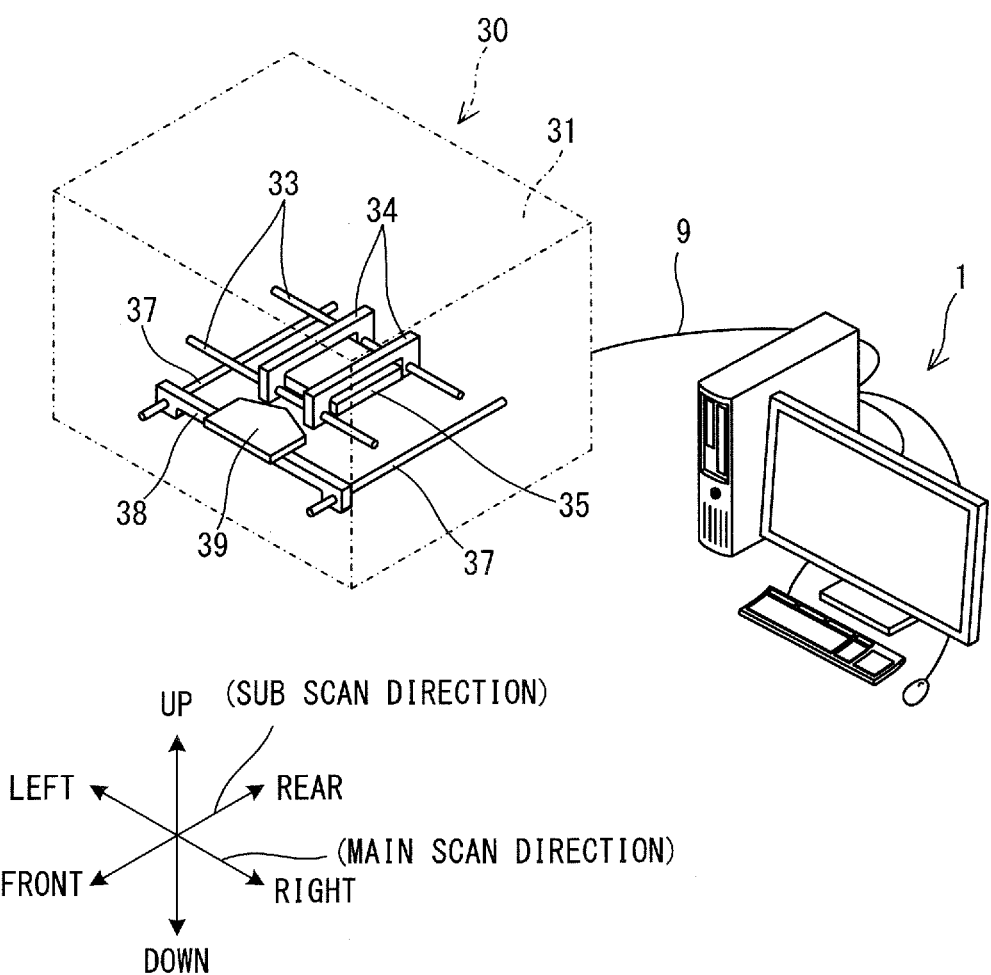
FIG. 1 is a perspective view showing an outline configuration of a print device and a PC.

A print device 30, which is an example of an image formation device according to the present disclosure, will be explained with reference to FIG. 1. The lower left side, the upper right side, the lower right side, the upper left side, the upper side and the lower side in FIG. 1 are, respectively, a front side, a rear side, a right side, a left side, an upper side, and a lower side of the print device 30.

Structure of the Print Device 30

The print device 30 is a known inkjet printer for use on cloth. The print device 30 prints an image on the cloth, which is a recording medium, by causing ejection heads 35 to perform scanning. A T-shirt or the like can be given as an example of the cloth. The print device 30 is connected to a personal computer (hereinafter referred to as a "PC") 1, via a cable 9. The PC 1 creates print data in order to cause the print device 30 to perform print processing on the cloth. The print data is transmitted from the PC 1 to the print device 30.

The print device 30 has a pair of guide rails 37 provided in a lower portion inside the housing 31. The pair of guide rails 37 extend in the front-rear direction. The pair of guide rails 37 support a platen support base 38 such that the platen support base 38 can move in the front-rear direction. A platen 39 is fixed to the platen support base 38, in the center, in the left-right direction, of the top surface of the platen support base 38. The platen 39 is a plate body. The cloth is placed on the top surface of the platen 39. The platen support base 38 is conveyed in a sub scan direction by a sub scan mechanism. The sub scan direction is the front-rear direction in which the cloth is conveyed by the platen 39. The sub scan mechanism includes a sub scan motor 47 (shown in FIG. 3), and a belt (not shown in the drawings).

The print device 30 is provided with a pair of guide rails 33, inside the housing 31 and above the platen 39. The pair of guide rails 33 extend in the left-right direction. The pair of guide rails 33 support a carriage 34 such that the carriage 34 can move in the left-right direction. The eight ejection heads 35 are mounted on a lower portion of the carriage 34. The carriage 34 provided with the eight ejection heads 35 is conveyed in a main scan direction, which is orthogonal to the sub scan direction, by a main scan mechanism. The main scan direction is the left-right direction in which the eight ejection heads 35 are conveyed by the carriage 34. The main scan mechanism includes a main scan motor 46 (shown in FIG. 3) and a belt (not shown in the drawings).

Figure 2:
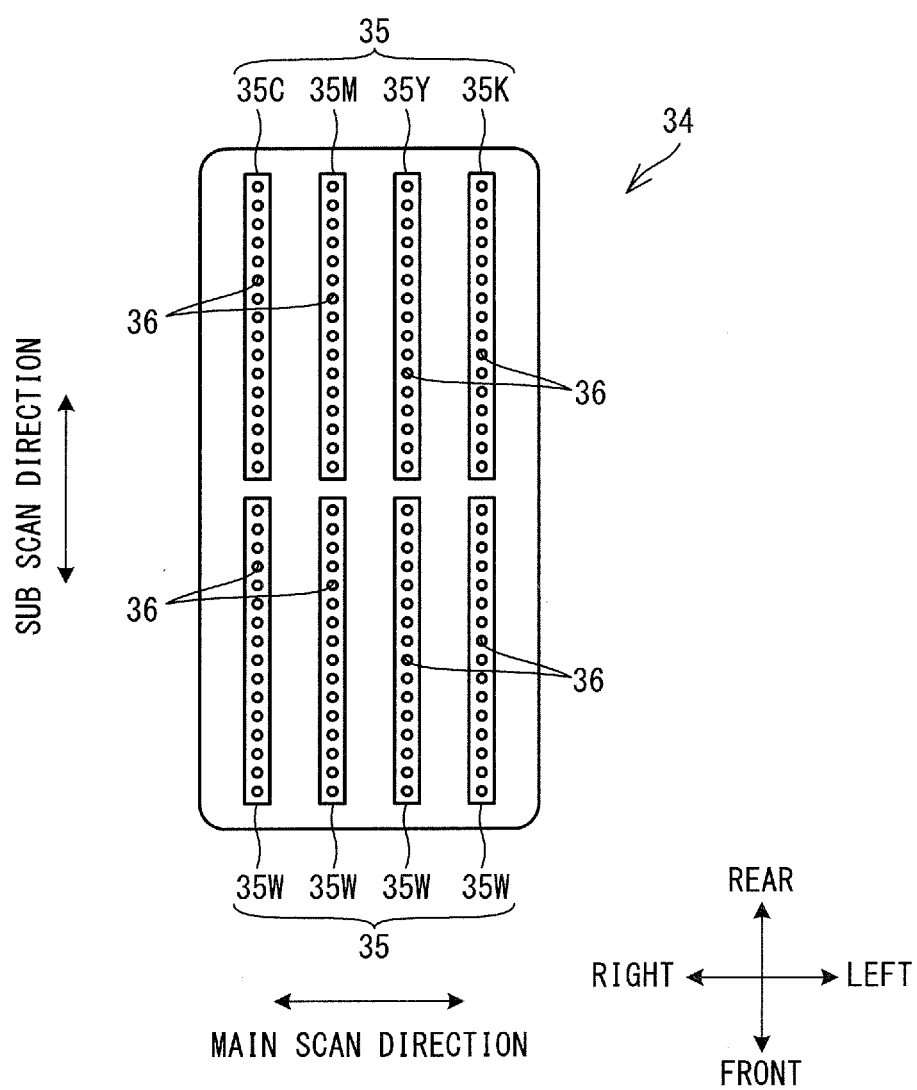
FIG. 2 is a bottom view showing an overall configuration of a carriage.

As shown in FIG. 2, four ejection heads 35W, and ejection heads 35C, 35M, 35Y, and 35K are mounted on the carriage 34. For convenience, in the following explanation, the four ejection heads 35W and the ejection heads 35C, 35M, 35Y, and 35K are also referred to as the ejection heads 35. A plurality of nozzles 36 are provided on a bottom surface of each of the ejection heads 35. The number of the plurality of nozzles 36 is 420. 420 of the nozzles 36 are provided on each of the total of eight ejection heads 35. In FIG. 2, for simplification, a smaller number of the nozzles 36 is shown than the actual number.

Each of the nozzles 36 can eject ink. Each of the nozzles 36 is arranged at an equal interval in the sub scan direction. A distance between each of the nozzles 36 is 1/300 inch. Hereinafter, the distance between each of the nozzles 36 is denoted by "D" (inch). Ink of an ink cartridge mounted in the print device 30 is supplied from the front side of the carriage 34. Although not described in detail here, the ink supplied to the ejection heads 35 is ejected downward from each of the nozzles 36, by driving of a piezoelectric element or a heating element provided in each of the nozzles 36.

The four ejection heads 35W are mounted on the carriage 34 such that the four ejection heads 35W are arranged in the main scan direction in a state in which a layout orientation of each of the nozzles 36 is along the sub scan direction. The four ejection heads 35W eject white ink from each of the nozzles 36. The ejection heads 35C, 35M, 35Y, and 35K are mounted on the carriage 34 such that the ejection heads 35C, 35M, 35Y, and 35K are arranged in the main scan direction in a state in which a layout orientation of each of the nozzles 36 is along the sub scan direction. The ejection heads 35C, 35M, 35Y, and 35K eject color inks from each of the nozzles 36. The ejection head 35C ejects cyan ink from the nozzles 36. The ejection head 35M ejects magenta ink from the nozzles 36. The ejection head 35Y ejects yellow ink from the nozzles 36. The ejection head 35K ejects black ink from the nozzles 36. The four ejection heads 35W that eject the white ink, and the ejection heads 35C, 35M, 35Y, and 35K that eject the color inks are arranged at intervals in the sub scan direction. A distance between the nozzles 36 furthest to the front side on each of the four ejection heads 35W, and the nozzles 36 furthest to the front side on each of the ejection heads 35C, 35M, 35Y, and 35K is 150 mm, for example.

The print device 30 forms a pixel array in the main scan direction by ejecting ink while causing the ejection heads 35 to scan in the main scan direction. One pixel array extends in the left-right direction. When the print device 30 completes the formation of the single pixel array by one main scan, the print device 30 moves the platen 39 in the sub scan direction and once more forms a single pixel array by the main scan. The print device 30 forms a plurality of pixel arrays by repeatedly performing the above-described operations in accordance with the print data. As a result, the print device 30 forms, on the cloth, an image in which the plurality of pixel arrays are arranged in the sub scan direction.

Clogging sometimes occurs in some of the plurality of nozzles 36 of the ejection heads 35W that eject the white ink. The plurality of nozzles 36 of the ejection heads 35W that eject the white ink become more easily clogged than the plurality of nozzles 36 of the ejection heads 35C, 35M, 35Y, and 35K that eject the color inks. As described above, the ink in the ink cartridge mounted in the print device 30 is supplied to the carriage 34 from the front side of the carriage 34. Thus, of the plurality of nozzles 36 of the ejection heads 35W for the white ink, the further the nozzle 36 is arranged to the rear of the carriage 34, the higher the possibility that clogging will occur. Specifically, for example, of the 420 nozzles 36, while the 1-st to 360-th nozzles 36, in order from the front side, eject the white ink appropriately, the 361-st to 420-th nozzles 36 may not appropriately eject the white ink due to clogging.

Electrical Configuration

An electrical configuration of the print device 30 will be explained with reference to FIG. 3. The print device 30 is provided with a CPU 40 that controls the print device 30. A ROM 41, a RAM 42, an ASIC 43, a head drive portion 44, a motor drive portion 45, a display control portion 48, an operation processing portion 50, and a USB interface 52 are connected to the CPU 40 via a bus 55.

The ROM 41 stores a main program that controls operations of the print device 30, initial values, and the like. The ROM 41 stores an LF value table 411 shown in FIG. 13, and a master mask table 412 shown in FIG. 16. The RAM 42 temporarily stores various data. The head drive portion 44 is connected to the ejection heads 35 that eject the ink. The ASIC 43 controls the head drive portion 44, and the motor drive portion 45. The head drive portion 44 drives the piezoelectric element or the heating element provided in each of the nozzles 36 of the ejection heads 35. The motor drive portion 45 drives the main scan motor 46 and the sub scan motor 47. The main scan motor 46 moves the carriage 34 in the main scan direction. The sub scan motor 47 moves the platen 39 in the sub scan direction. The display control portion 48 controls display of a display 49 in accordance with an instruction from the CPU 40. Various screens, messages, and the like relating to the operation of the print device 30 are displayed on the display 49. The operation processing portion 50 receives the input of an operation with respect to an operation panel 51. A user can input various pieces of information and instructions via the operation panel 51. The USB interface 52 connects the print device 30 to an external device, such as the PC 1.

Overview of Operations of the Print Device 30

Figure 4:
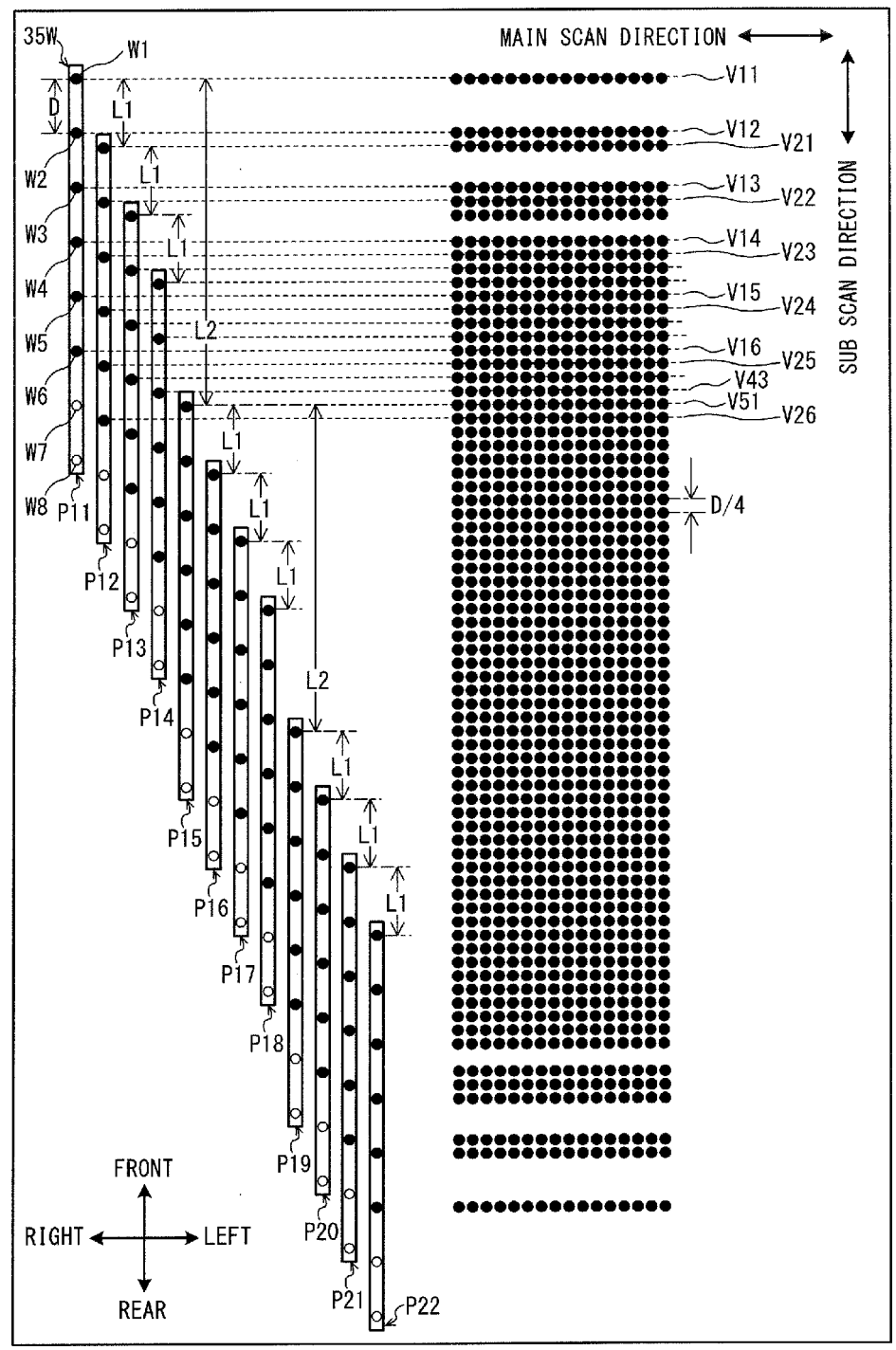
FIG. 4 is a diagram showing a process of forming a white ink image using an ejection head.
Figure 5:
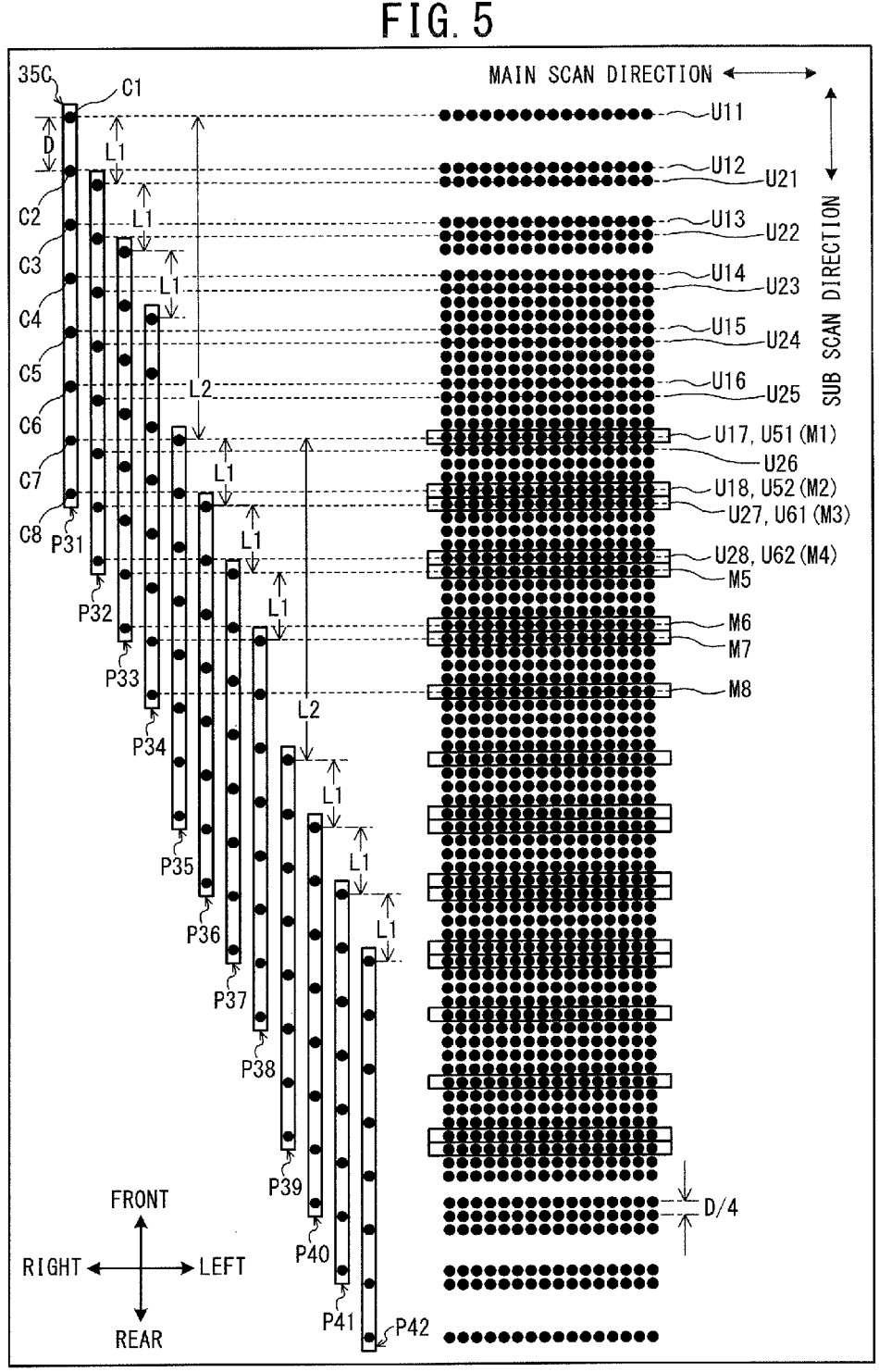
FIG. 5 is a diagram showing a process of forming a color ink image using an ejection head.

An overview of operations of the print device 30 will be explained with reference to FIG. 4 and FIG. 5. FIG. 4 shows a state in which the ejection head 35W that ejects the white ink moves relatively in the sub scan direction. FIG. 5 shows a state in which the ejection head 35C that ejects the cyan ink moves relatively in the sub scan direction. Below, for ease of explanation, movement of the platen 39 in the sub scan direction relative to the ejection head 35 will be re-phrased as "the ejection heads 35 move relatively in the sub scan direction." Further, unless otherwise particularly specified, "the ejection heads 35 move relatively in the sub scan direction" indicates that "the ejection heads 35 move relatively toward the rear." In this case, in actuality, the platen 39 moves toward the front with respect to the carriage 34 on which the ejection heads 35 are mounted.

In FIG. 4, for ease of explanation, the number of the nozzles 36 included in each of the ejection heads 35 is smaller than the actual number of 420, and eight of the nozzles 36 are shown. In FIG. 4, of the four ejection heads 35W that eject the white ink, an overview of the operation of one of the ejection heads 35W will be explained. The eight nozzles 36 of the ejection head 35W are respectively referred to as nozzles W1, W2, W3, W4, W5, W6, W7, and W8, in order from the front side. As shown in FIG. 5, the eight nozzles 36 of the ejection head 35C that ejects the cyan ink are referred to as C1 to C8, in order from the front side. The distance between each of the eight nozzles 36 is $\frac{1}{300}$ (inch). It is assumed that a resolution of an image formed by the ejection heads 35 is "1200 (dpi) (main scan direction)× 1200 (dpi) (sub scan direction)." The resolution "1200 (dpi)" in each direction is denoted by "R." The distance D between each of the eight nozzles 36 and the resolution R satisfy a relationship R=4/D. A number of ink ejection points (hereinafter referred to as "dots") included in a single pixel array is assumed to be "16," as shown in FIG. 4. Within a range in which the carriage 34 can move in the main scan direction, a position furthermost to the right side is referred to as an "initial position."

Forming White Ink Image (with Prohibition of Ejection of White Ink from Nozzles W7 and W8)

With reference to FIG. 4, an operation will be explained for a case in which an image including white ink (hereinafter referred to as a "white ink image") is formed. As described above, there is a case in which clogging occurs in particular in some of the plurality of nozzles 36 of the ejection heads 35W that eject the white ink. Below, the explanation is given while assuming that, of the nozzles W1 to W8 of the ejection heads 35W shown in FIG. 4, the nozzles W7 and W8 arranged on the rear side of the carriage 34 are more likely to become clogged. Hereinafter, a state is explained in which the driving of the piezoelectric elements or the heating elements corresponding to the nozzles W7 and W8 is prohibited. A state in which the driving of the piezoelectric elements or the heating elements corresponding to the nozzles W7 and W8 is allowed will be described later.

In order to form the white ink image at the resolution R using the single ejection head 35W, the print device 30 causes the white ink to be ejected onto the cloth from the nozzles W1 to W6 (a process P11). Next, the print device 30 moves the ejection head 35W in the main scan direction. The print device 30 repeats the ejection of the white ink and the movement of the ejection head 35W in the main scan direction 16 times. Therefore, using the single ejection head 35W, the print device 30 forms, on the cloth, six pixel arrays in which the 16 dots are arranged at intervals of a distance D/4 in the main scan direction. Below, the six pixel arrays formed, respectively, by the nozzles W1 to W6 in the process P11 are referred to as pixel arrays V11 to V16. The pixel arrays V11 to V16 are arranged on the cloth at intervals of the distance D in the sub scan direction.

Next, the print device 30 relatively moves the ejection head 35W in the sub scan direction by D/4×5. Below, D/4×5, which is the movement distance in the sub scan direction, is denoted by "L1." The movement distance in the sub scan direction corresponds to a distance excluding integral multiples "D, 2D, 3D . . . " of the distance D between each of the adjacent nozzles W1 to W6. In the case of the present embodiment, the movement distance in the sub scan direction is "D+(value less than D)." After that, the print device 30 moves the ejection head 35W in the main scan direction. The print device 30 causes the white ink to be ejected onto the cloth from the nozzles W1 to W6 at intervals of D/4 in the main scan direction (a process P12). Below, six pixel arrays formed by each of the nozzles W1 to W6 in the process P12 are referred to as pixel arrays V21 to V26. Each of the pixel arrays V21 to V25 is formed to the rear of each of the pixel arrays V12 to V16 formed in the process P11, by the distance D/4. The pixel array V26 is formed to the rear of the pixel array V16 formed in the process P11, by the distance L1.

Further, the print device 30 relatively moves the ejection head 35W by the distance L1 in the sub scan direction, and next, causes the white ink to be ejected onto the cloth from the nozzles W1 to W6 while moving the ejection head 35W in the main scan direction. The print device 30 repeats the above-described operation twice (a process P13, and a process P14). As a result of the processes P12 to P14, three pixel arrays are formed, at intervals of the distance D/4 in the sub scan direction, between the pixel arrays V14 and V15 formed in the process P11. Three pixel arrays are formed, at intervals of the distance D/4 in the sub scan direction, between the pixel arrays V15 and V16 formed in the process P11. Thus, in a section between the pixel arrays V14 to V16, the white ink dots are arranged in a lattice formation at the intervals of the distance D/4. The resolution R between the pixel arrays V14 to V16 is thus 4/D.

An example will be given of a case in which the print device 30 repeats a next series of operations. The series of operations are operations in which, after the process P14, the print device 30 further moves the platen 39 relatively in the sub scan direction by the distance L1, and next causes the white ink to be ejected onto the cloth from the nozzles W1 to W6 while moving the ejection head 35W in the main scan direction. When the operations are performed, the white ink from the nozzle W1 is ejected at a position of the pixel array V16 formed in the process P11.

However, so that the white ink is not ejected in an overlapping manner at the position of the pixel array V16, after the process P14, the print device 30 relatively moves the ejection head 35W to a position separated by a distance D×6 in the sub scan direction from a position of the ejection head 35W in the process P11. Below, the distance D×6 is denoted by "L2." The value "6" here corresponds to the number of the nozzles W1 to W6, which, among the nozzles W1 to W8 of the ejection head 35W, are most likely to eject the white ink in actuality. Thus, L2 corresponds to a length in the sub scan direction of an area of the ejection head 35W in which the nozzles W1 to W6 are arranged. During the execution of the processes P11 to P14, the ejection head 35W moves relatively in the sub scan direction by a distance corresponding to a total of L1×3. Thus, a movement amount of the relative movement in the sub scan direction of the ejection head 35W after the process P14 is L2−(L1×3) (=(D×6)−((D/4×5)×3)=(D/4×9)).

The print device 30 relatively moves the ejection head 35W in the sub scan direction as described above, and next, moves the ejection head 35W in the main scan direction. The print device 30 causes the white ink to be ejected onto the cloth from the nozzles W1 to W6, at intervals of D/4 in the main scan direction (a process P15).

A position in the sub scan direction of the nozzle W1 of the ejection head 35W in the process P15 matches a position of the nozzle W7 of the ejection head 35W in the process P11. As described above, since the ejection of the white ink from the nozzle W7 is prohibited, a pixel array is not formed by the nozzle W7 in the process P11. In the processes P12 to P14, the pixel array is not formed at the position in the sub scan direction of the nozzle W7 of the ejection head 35W in the process P11. Thus, in the process P15, the dots of white ink ejected from the nozzle W1 are formed in a section in which the pixel array has not been formed in the processes P12 to P14. The pixel array formed by the nozzle W1 in the process P15 (hereinafter referred to as a "pixel array V51") is arranged by the distance D/4 to the front of the pixel array V26 formed by the nozzle W6 in the process P12 and by the distance D/4 to the rear of the pixel array formed by the nozzle W3 in the process P14 (hereinafter referred to as a "pixel array V43").

In each of processes from the process P15 to a process P18, the same operations are performed as in each of the processes P11 to P14, taking the position of the ejection head 35W in the process P15 as a reference. After the process P18, the print device 30 causes the ejection head 35W to move relatively in the sub scan direction by a distance corresponding to D/4×9. In other words, the print device 30 relatively moves the ejection head 35W to a position separated by the distance L2, in the sub scan direction, from the position of the ejection head 35W in the process P15 (a process P19). After that, the print device 30 moves the ejection head 35W in the main scan direction and causes the white ink to be ejected from the nozzles W1 to W6 (the process P19). In each of processes from the process P19 to a process P22, the same operations are performed as in each of the processes P11 to P14 and in each of the processes P15 to P18, taking the position of the ejection head 35W in the process P19 as a reference.

As described above, by the white ink being ejected from the ejection head 35W in the processes P11 to P22, the pixel arrays, each including the sixteen white ink dots aligned in the main scan direction, are arranged in the sub scan direction. Thus, the white ink image is formed on the cloth. As described above, the print device 30 controls the amount of the relative movement of the ejection head 35W in the sub scan direction so that the ink is not ejected in an overlapping manner. Thus, the white ink image with a low degree of unevenness in density is formed on the cloth.

The operations of one of the four ejection heads 35W is explained above. In actuality, as shown in FIG. 2, the four ejection heads 35W are mounted on the carriage 34 in a state of being arranged in the main scan direction. Each of the ejection heads 35W ejects the white ink from the nozzles W1 to W6 while moving relatively in the main scan direction, and the ejection heads 35W thus form the six pixel arrays. The positions of the six pixel arrays formed by the nozzles W1 to W6 of each of the ejection heads 35W match each other in the sub scan direction. Thus, each of the pixel arrays formed by the nozzles W1 to W6 of each of the ejection heads 35W is formed as a single pixel array as a result of the pixel arrays formed by each of the four ejection heads 35W being overlaid on each other.

Forming Color Ink Image

Next, with reference to FIG. 5, a case will be explained in which, at the same time that the white ink image is formed by the ejection heads 35W moving relatively in the sub scan direction as shown in FIG. 4, an image including the cyan ink (hereinafter referred to as a "cyan ink image") is formed by the cyan ink being ejected from the ejection head 35C. The ejection heads 35W and 35C are all mounted on the carriage 34 and thus, the ejection head 35C moves together with the ejection heads 35W. Processes P31 to P42 shown in FIG. 5 correspond, respectively, to the processes P11 to P22 shown in FIG. 4. Operations when an image including the other color inks (hereinafter referred to as a "color ink image") is formed by the ejection heads 35M, 35Y, and 35K are the same as those when the cyan ink image is formed by the ejection head 35C.

The print device 30 moves the ejection head 35C in the main scan direction. At a timing at which the white ink is ejected in the process P11 shown in FIG. 4, the print device 30 causes the cyan ink to be ejected onto the cloth from the nozzles C1 to C8 (the process P31). As a result of the above operations, the print device 30 forms, on the cloth, eight pixel arrays in which 16 dots are arranged in the main scan direction. Below, the eight pixel arrays formed by each of the nozzles C1 to C8 in the process P31 are referred to as pixel arrays U11 to U18. The pixel arrays U11 to U18 are arranged on the cloth at intervals of the distance D in the sub scan direction.

Next, the print device 30 relatively moves the ejection head 35C in the sub scan direction by the distance L1. After that, the print device 30 moves the ejection head 35C in the main scan direction. At a timing at which the white ink is ejected, the print device 30 causes the cyan ink to be ejected onto the cloth from the nozzles C1 to C8 (the process P32). Below, eight pixel arrays formed by each of the nozzles C1 to C8 in the process P32 are referred to as pixel arrays U21 to U28. Each of the pixel arrays U21 to U27 are formed by the distance D/4 to the rear of each of the pixel arrays U12 to U18 formed in the process P31. The pixel array U28 is arranged by the distance L1 to the rear of the pixel array U18 formed in the process P31.

Further, the print device 30 relatively moves the ejection head 35C in the sub scan direction by the distance L1, and next, twice repeats the operations to cause the cyan ink to be ejected from the nozzles C1 to C8 while causing the ejection head 35C to scan in the main scan direction (the process P33, and the process P34). By the processes P32 to P34, three pixel arrays are respectively formed, at intervals of D/4 in the sub scan direction, between the pixel arrays U14 and U15 formed in the process P31, between the pixel arrays U15 and U16, between the pixel arrays U16 and U17, and between the pixel arrays U17 and U18. As a result, the resolution R between the pixel arrays U14 to U18 becomes 4/D.

Next, after the process P34, the print device 30 relatively moves the ejection head 35C to a position separated by the distance L2, in the sub scan direction, from a position of the ejection head 35C in the process P31. After that, the print device 30 moves the ejection head 35C in the main scan direction. The print device 30 causes the cyan ink to be ejected onto the cloth from the nozzles C1 to C8 at intervals of D/4 (the process P35). Below, pixel arrays formed by each of the nozzles C1 and C2 in the process P35 are referred to as pixel arrays U51 and U52. In this case, the pixel array U51 is formed by the nozzle C1 in the position of the pixel array U17 formed in the process P31. Specifically, a single one of the pixel arrays (hereinafter referred to as a "pixel array M1") is formed by the dots included in the pixel arrays U17 and U51. The pixel array U52 is formed by the nozzle C2 in the position of the pixel array U18 formed in the process P31. Specifically, a single one of the pixel arrays (hereinafter referred to as a "pixel array M2") is formed by the dots included in the pixel arrays U18 and U52. The method of causing the different nozzles 36 to scan the same position and forming the single pixel array as described above is generally called a "multi-pass" or "singling" method.

The print device 30 ensures that, of the pixel array M1, the position of the cyan ink ejected from the nozzle C7 in the process P31 does not overlap with the position of the cyan ink ejected from the nozzle C1 in the process P35 in the main scan direction. When forming the pixel array M1, the print device 30 causes the cyan ink to be ejected in the process P31 and the process P35 such that a sum of the number of dots formed by the nozzle C7 in the process P31 and the number of dots formed by the nozzle C1 in the process P35 is "16." In this case, a density difference between the pixel arrays M1 and M2 formed by the multi-pass method and the other pixel arrays is suppressed. When forming the pixel arrays U18 and U52 also, the print device 30 causes the cyan ink to be ejected from the nozzles C8 and C2 using the same method.

In each of processes from the process P35 to a process P38, the same operations are performed as in each of the processes P31 to P34, taking the position of the ejection head 35C in the process P35 as a reference. In this case, for example, a single one of the pixel arrays (hereinafter referred to as a "pixel array M3") is formed by the pixel array formed by the nozzle C1 in the process P36 (hereinafter referred to as a "pixel array U61"), and the dots included in the pixel array U27. A single one of the pixel arrays (hereinafter referred to as a "pixel array M4") is formed by the pixel array formed by the nozzle C2 in the process P36 (hereinafter referred to as a "pixel array U62"), and the dots included in the pixel array U28. Then, in a similar manner, pixel arrays M5 and M6 are formed in the processes P33 and P37, and pixel arrays M7 and M8 are formed in the processes P34 and P38. In these cases, with the print device 30, the positions of dots used to form the pixel arrays M3 to M8 in the respective two processes do not overlap. The print device 30 sets a sum of the number of the dots used to form the pixel arrays M3 to M8 in the respective two processes to be "16." In each of processes from a process P39 to a process P42, the same operations are performed as in each of the processes P31 to P34 and in each of the processes P35 to P38, taking the position of the ejection head 35C in the process P39 as a reference.

As described above, the print device 30 controls the amount of the relative movement in the sub scan direction of the ejection heads 35W so that the white ink image is formed with a low degree of unevenness in density. At the same time, the print device 30 suppresses an unevenness in density of the cyan ink image by controlling the ejection of the cyan ink from the ejection head 35C as described above. As will be described later, of the two processes to form the single pixel array using the multi-pass method, the print device 30 sets the sum of the number of dots formed in the former process and the number of dots formed in the latter process to be "16," while causing a ratio between the number of dots of the former and latter processes to change for each of the plurality of nozzles 36. As a result of the above-described processing, the print device 30 makes less conspicuous a boundary section between an area in which the pixel arrays formed by the multi-pass method are included and an area in which the pixel arrays formed by the multi-pass method are not included.

Forming White Ink Image (with Allowance of Ejection of White Ink from Nozzles W7 and W8)

Next, operations in a case in which the white ink image is formed when the ejection of the white ink from the nozzles W7 and W8 is allowed will be explained with reference to FIG. 4. Main processing shown in FIG. 7 (to be described later) shows processing in a case in which the ejection of the white ink from the nozzles W7 and W8 is allowed. Since there is a possibility that clogging has occurred in the nozzles W7 and W8, the amount of the white ink ejected from the nozzles W7 and W8 may be smaller than the amount of the white ink ejected from the nozzles W1 to W6.

In contrast to the case shown in FIG. 4, since the white ink is ejected from the nozzles W7 and W8, pixel arrays are also formed by the nozzles W7 and W8. Thus, similarly to the above-described case shown in FIG. 5 in which the color ink image is formed, white ink pixel arrays are formed by the multi-pass method. Specifically, in a latter process, a pixel array is formed by the nozzle W1 in the position of a pixel array formed by the nozzle W7 in a former process. In a latter process, a pixel array is formed by the nozzle W2 in the position of a pixel array formed by the nozzle W8 in a former process. In other words, a single one of the pixel arrays is formed by the dots of the pixel array formed by the former process, and the dots of the pixel array formed by the latter process.

The print device 30 ensures that the positions of the dots formed in each of the two processes to form the single pixel array using the multi-pass method, do not overlap. The print device 30 sets the sum of the number of dots formed in each of the two processes to form the single pixel array using the multi-pass method to be "16." Further, of the two processes to form the single pixel array using the multi-pass method, the print device 30 sets a ratio of the number of dots formed by the nozzles W7 and W8 in the former process to be 25%, in relation to the total number of dots. The total number of dots indicates a total number of the dots included in the single pixel array. In the case of FIG. 4, the total number of dots is "16." Meanwhile, the print device 30 sets a ratio of the number of dots formed by the nozzles W1 and W2 in the latter process to be 75%, in relation to the total number of dots. The reason for this is that the amount of the white ink ejected from the nozzles W7 and W8 may be smaller than the amount of the white ink ejected from the nozzles W1 to W6. The print device 30 sets the ratio of the number of dots formed by the nozzles W1 and W2 to be higher than the ratio of the number of dots formed by the nozzles W7 and W8. As a result, even when a degree of clogging is greater in the nozzles W7 and W8, the white ink pixel arrays can be appropriately formed.

Print Data

Print data 421 will be explained with reference to FIG. 6. The print data 421 is transmitted to the print device 30 from the PC 1 shown in FIG. 1, via the cable 9. When the CPU 40 of the print device 30 receives the print data 421 via the cable 9, the CPU 40 stores the received print data 421 in a reception buffer of the RAM 42. Based on the received print data 421, the CPU 40 forms the white ink image and the color ink image on the cloth, by executing the main processing shown in FIG. 7 to be described later.

The print data 421 includes header information, raster information, and footer information. The header information includes resolution, platen information, and print method specification information. The resolution indicates the resolution of the image to be printed. Below, it is assumed that "1200 (dpi)" is stored as the resolution R. The distance D between each of the nozzles 36 and the resolution R are explained as satisfying a relationship of R=4/D. The platen information indicates an area of the platen 39 supported by the platen support base 38, using coordinate information. The print method specification information indicates which of the following applies to the image to be printed based on the print data 421: (1) includes only the white ink image; (2) includes only the color ink image; and (3) includes both the white ink image and the color ink image.

The raster information includes image row numbers, color information, a left margin, a right margin, and raster data. The image row number indicates a number ("1," "2," "3," . . . ) that is assigned, in order from the front side, to each of a plurality of rows aligned at the intervals of D/4 in the sub scan direction. Each of the plurality of rows indicates a position onto which the pixel array can be formed on the recording medium.

The color information is information indicating the color of the ink used to form the pixel array on the row indicated by the corresponding image row number. As the color information, white 1 to 4, cyan, magenta, yellow, and black are associated with the image row numbers. One of the pixel arrays is formed by the ink being ejected from the total of the eight ejection heads 35, namely, from the four ejection heads 35W (white 1 to 4), and the ejection heads 35C (cyan), 35M (magenta), 35Y (yellow), and 35K (black). As a result, as shown in FIG. 6, the eight different pieces of color information (white 1 to 4, cyan, magenta, yellow, and black) are associated with the shared image row numbers "1," "2," and so on.

The left margin and the right margin are pieces of information to identify positions (to be described later) of the platen 39, based on encoders (not shown in the drawings) provided on the guide rails 33. The left margin indicates a position of the platen 39 corresponding to the left end of the pixel array formed on the row indicated by the image row number, using a distance from the left end of the platen 39. The right margin indicates a position of the platen 39 corresponding to the right end of the pixel array formed on the row indicated by the image row number, using a distance from the right end of the platen 39.

The raster data indicates whether or not to eject the ink from the nozzle 36 to form the pixel array. The raster data is bit information in which one of "1" and "0" is arranged. The bit "1" of the raster data indicates that the ink dot is to be ejected from the nozzle 36. The bit "0" of the raster data indicates that the ink dot is not to be ejected from the nozzle 36.

Main Processing

The main processing executed by the CPU 40 will be explained with reference to FIG. 7 to FIG. 17. When a power switch (not shown in the drawings) of the operation panel 51 shown in FIG. 2 is switched on, the CPU 40 reads the main program from the ROM 41, and executes the main processing.

Figure 7:
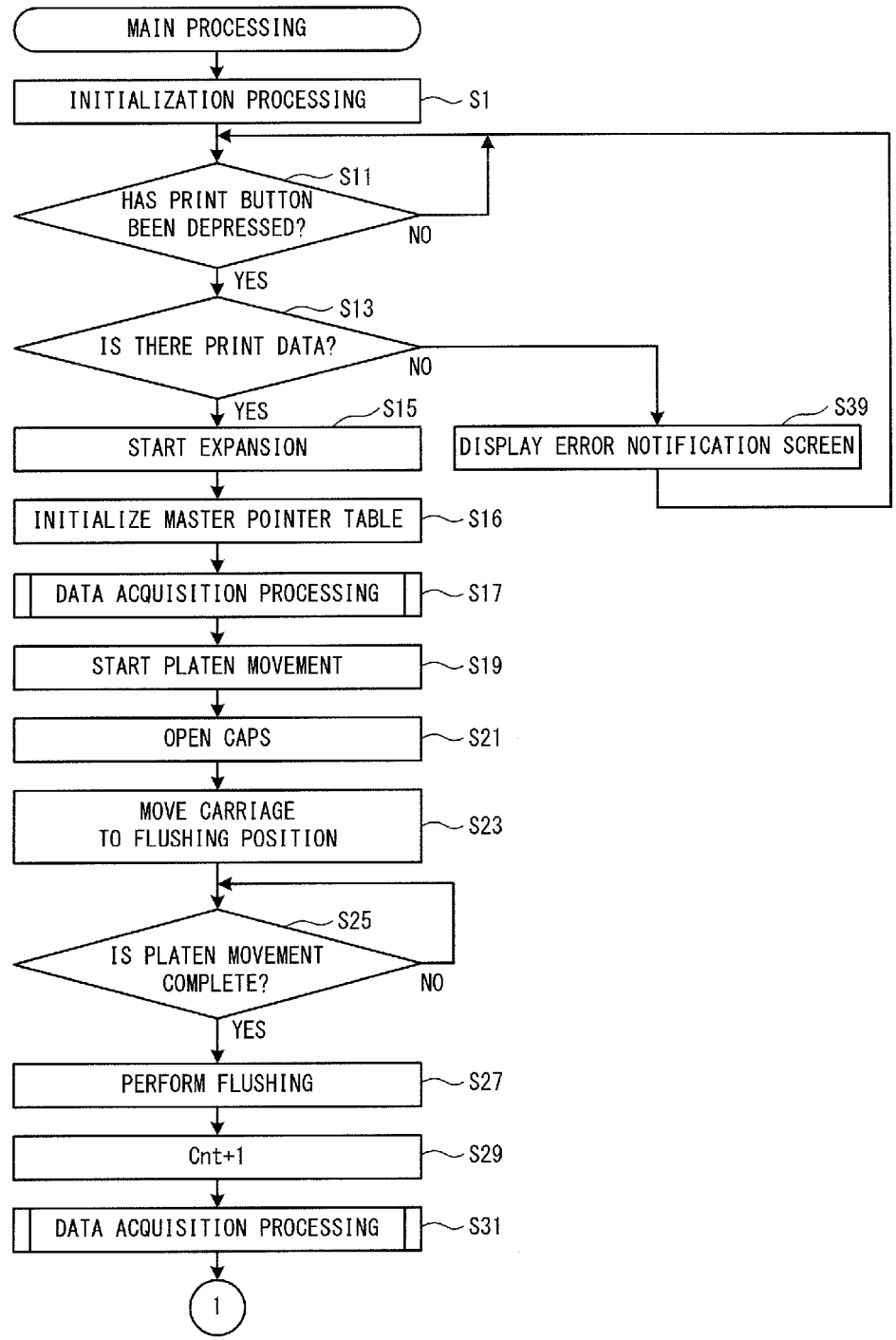
FIG. 7 is a flowchart of main processing.

As shown in FIG. 7, the CPU 40 first performs initialization processing (step S1). An example of the initialization processing will be explained. The CPU 40 sets a state in which all the ejection heads 35 are covered by caps. The CPU 40 arranges the carriage 34 in the initial position. The CPU 40 moves the platen 39 to a position furthermost to the front side. The CPU 40 initializes variables stored in the RAM 42. For example, the CPU 40 sets a variable "Cnt," which indicates a number of main scans, to "1." The CPU 40 sets "0" in each of a white mask table [420], and a color mask table [420], each of which consists of 420 rows. The CPU 40 initializes an X number (X=1, 2, . . . ) of print buffers [X].

Figure 9:
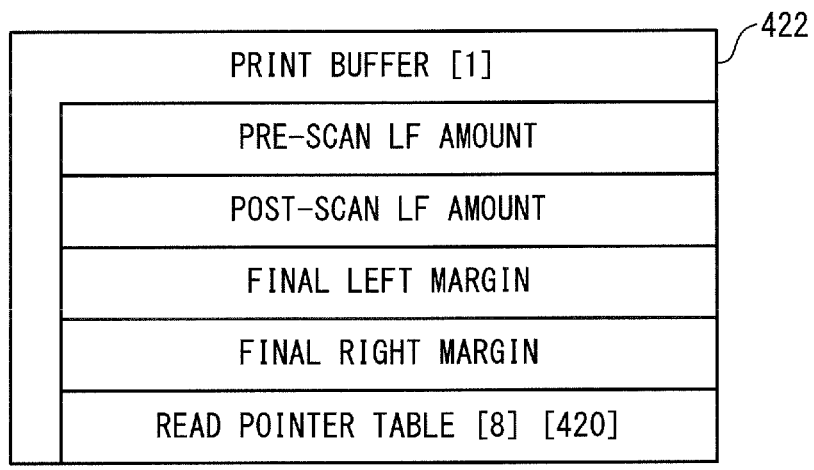
FIG. 9 is a diagram showing a print buffer [1]

FIG. 9 shows a print buffer [1] 422, which is an example of the print buffer [X]. A pre-scan LF amount, a post-scan LF amount, a final left margin, a final right margin, and a read pointer table [8] [420] are stored in the print buffer [1] 422. The pre-scan LF amount, the post-scan LF amount, the final left margin, and the final right margin will be explained later. 8×420 pointers included in a master pointer table 423 (to be described later) shown in FIG. 10 are stored in the read pointer table [8] [420]. As a result of the initialization processing at step S1, the CPU 40 sets each of the pre-scan LF amount, the post-scan LF amount, the final left margin, and the final right margin to "0." Below, a subscript of each of the above-described white mask table, color mask table, and print buffer is referred to as an "index."

Figure 3:
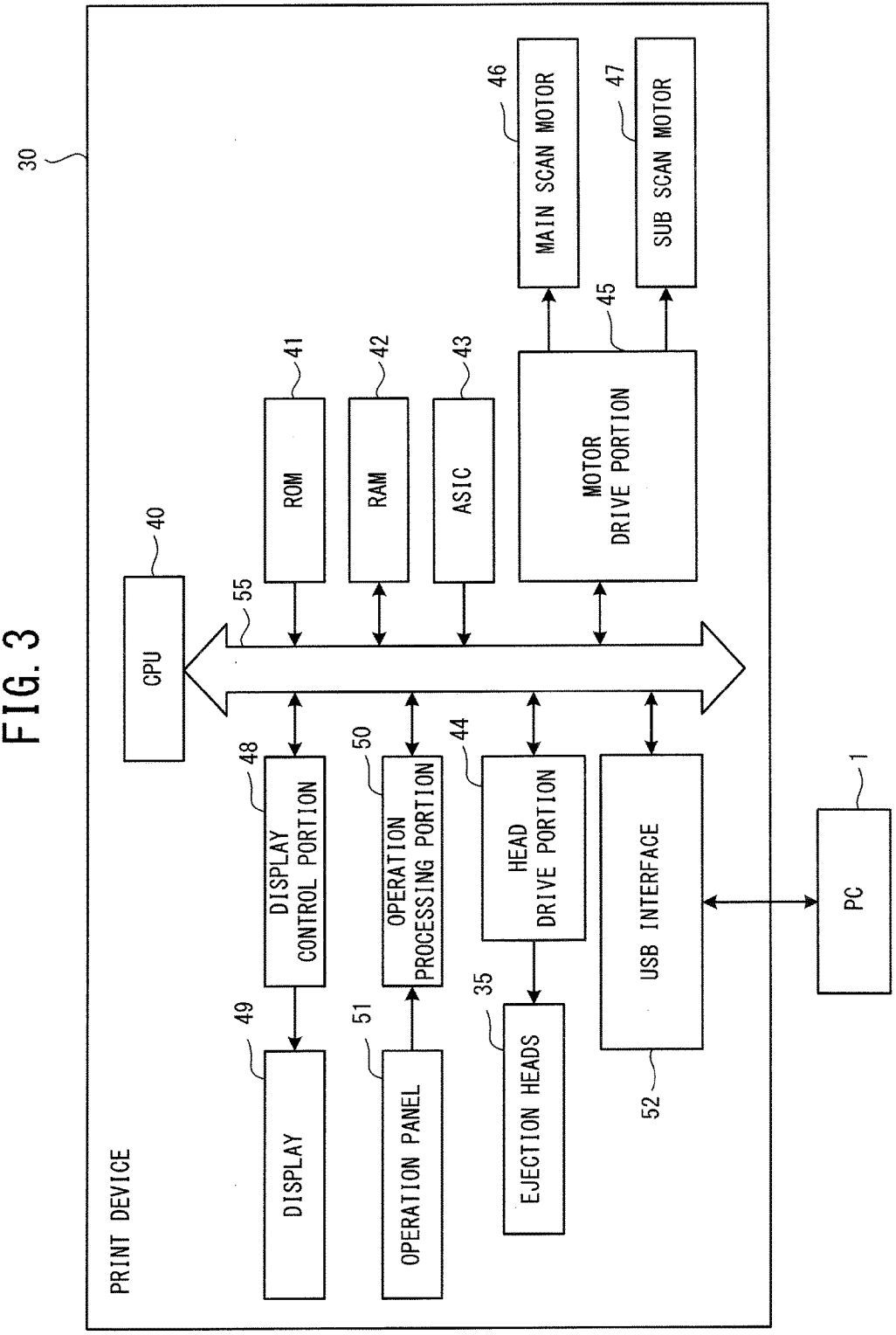
FIG. 3 is a block diagram showing an electrical configuration of the print device.

As shown in FIG. 7, the CPU 40 determines whether a print button (not shown in the drawings) of the operation panel 51 shown in FIG. 3 has been depressed (step S11). When the CPU 40 determines that the print button has not been depressed (no at step S11), the CPU 40 returns the processing to step S11. The CPU 40 continues to monitor for the depression of the print button. When the CPU 40 determines that the print button has been depressed (yes at step S11), the CPU 40 advances the processing to step S13. The CPU 40 determines whether the print data 421 shown in FIG. 6 is stored in the reception buffer (step S13). When the CPU 40 determines that the print data 421 is not stored in the reception buffer (no at step S13), the CPU 40 displays an error notification screen, which indicates that the print data 421 is not stored in the reception buffer, on the display 49 shown in FIG. 3 (step S39). The CPU 40 returns the processing to step S11.

When the CPU 40 determines that the print data 421 is stored in the reception buffer (yes at step S13), the CPU 40 starts processing to expand the raster information, of the print data 421 shown in FIG. 6 (step S15). The processing to expand the raster information is performed at the same time as the main processing, by separate processing that is performed in parallel with the main processing. The expanded raster information is stored in an expansion buffer in the RAM 42.

The CPU 40 initializes the master pointer table 423 (shown in FIG. 10), which is stored in the RAM 42, as described below (step S16). As shown in FIG. 10, head types, nozzles, and pointers are associated with each other in the master pointer table 423. The head types indicate the total of eight ejection heads 35 (the four ejection heads 35W (white 1 to 4), the ejection head 35C (cyan), the ejection head 35M (magenta), the ejection head 35Y (yellow), and the ejection head 35K (black)) mounted on the carriage 34. The nozzles indicate the 420 nozzles 36 of each of the eight ejection heads 35 (hereinafter referred to as a nozzle [1], a nozzle [2], . . . a nozzle [420]). As each of the pointers, a pointer is associated that indicates one line of raster data, among the raster information stored in the expansion buffer.

As the pointer corresponding to the nozzle [1] of the head type "white 1" of the master pointer table 423, the CPU 40 associates a pointer that indicates, from among the raster information stored in the expansion buffer, the raster data corresponding to the image row number "1" and to the color information "white 1." As the pointer corresponding to the nozzle [2] of the head type "white 1" of the master pointer table 423, the CPU 40 associates a pointer that indicates, from among the raster information stored in the expansion buffer, the raster data corresponding to the image row number "5" and to the color information "white 1." The reason for this is that, since the distance between the ejection heads 35 of the ejection heads 35W is D, which is four times the interval D/4 between the pixel arrays in the sub scan direction, the image row number corresponding to the nozzle [2] is 5 (=4+1).

Below, as the pointers corresponding to each of the nozzles [n] (n=1, 2, . . . 420) of the head type "white 1" of the master pointer table 423, the CPU 40 uses the same method to associate the pointers that indicate, from among the raster information, the raster data corresponding to the image row numbers "4 (n−1)+1" and to the color information "white 1." The CPU 40 associates the pointers corresponding to the nozzles [1] to [420] of the head types "white 2 to white 4" of the master pointer table 423 using the same method as that described above.

As the pointer corresponding to the nozzle [n] of the head type "cyan" of the master pointer table 423, the CPU 40 associates a pointer that indicates, from among the raster information stored in the expansion buffer, the raster data corresponding to the image row number "4 (419+n)−7086" and to the color information "cyan." The reason for subtracting "7086" is that, since a distance of separation between the four white ink ejection heads 35W and the cyan ink ejection head 35C shown in FIG. 2 is 150 mm, the image row number corresponding to the amount of separation is calculated. The value "7086" is derived by the expression "(150/25.4) (inch)×1200 (dpi)." Note that, when the image row number calculated by "4 (419+n)−7086" is a negative value, the CPU 40 associates a pointer indicating raster data in which all of the bits are "0." In this case, the ejection of the cyan ink from the ejection head 35C is started after 7086 pixel arrays have been formed by the ejection of the white ink from the ejection heads 35W. Thus, the cyan ink is ejected so as to overlap with the formed white ink pixel arrays. Using the same method, the CPU 40 associates pointers corresponding to the nozzles [1] to [420] of the head types "magenta," "yellow," and "black."

Figure 11:
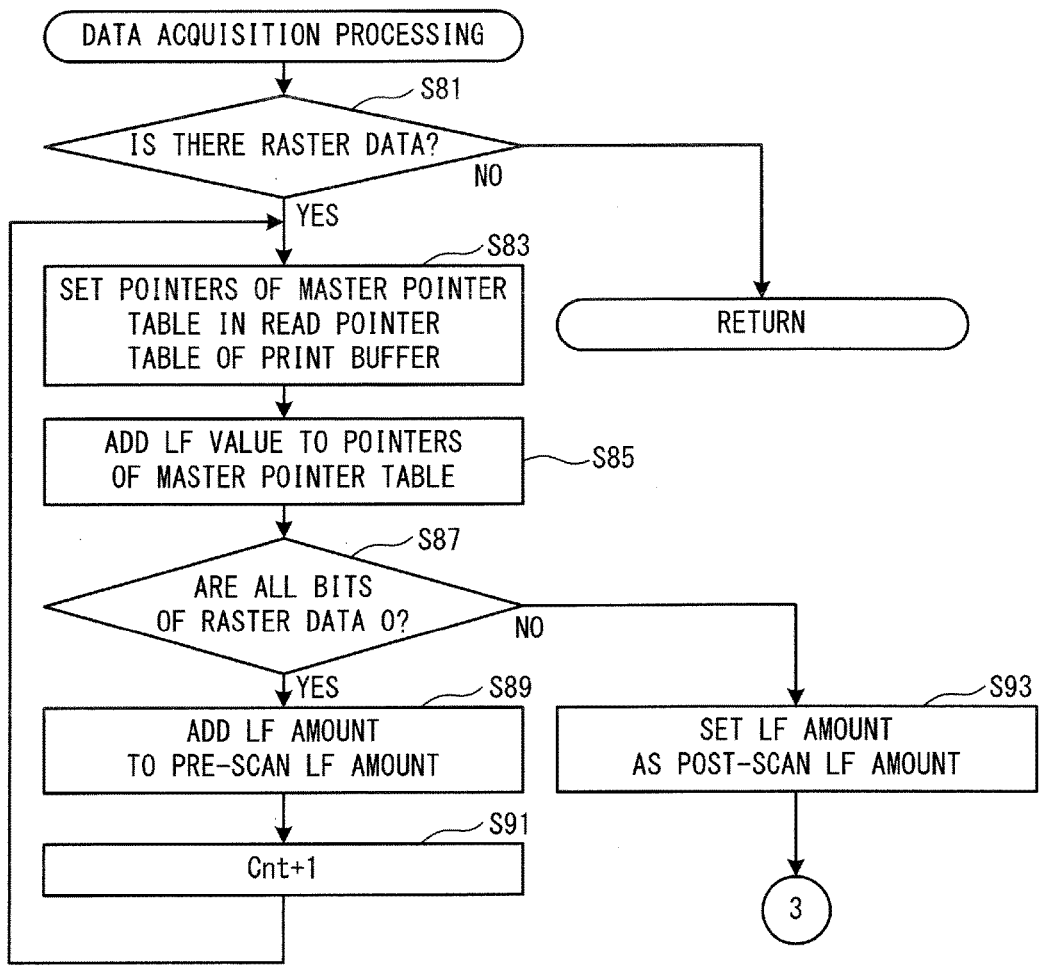
FIG. 11 is a flowchart of data acquisition processing.

As shown in FIG. 7, after initializing the master pointer table 423 by the processing at step S16, the CPU 40 performs data acquisition processing shown in FIG. 11 (step S17). The data acquisition processing will be explained with reference to FIG. 11. In the data acquisition processing, the CPU 40 stores, in a read pointer table of a print buffer [Cnt], the pointer indicating the raster data to be used when causing the carriage 34 to move in the main scan direction for the Cnt-th time. The CPU 40 determines whether all of the raster data indicated by the 8×420 pointers in the master pointer table 423 shown in FIG. 10 are included in the raster information stored in the expansion buffer (step S81). When the CPU 40 determines that all the raster data indicated by the 8×420 pointers in the master pointer table 423 are not included in the raster information stored in the expansion buffer (no at step S81), the CPU 40 ends the data acquisition processing and returns the processing to the main processing shown in FIG. 7.

When the CPU 40 determines that all the raster data indicated by the 8×420 pointers in the master pointer table 423 are included in the raster information stored in the expansion buffer (yes at step S81), the CPU 40 advances the processing to step S83. The CPU 40 sets the 8×420 pointers of the master pointer table 423 as the read pointer table [8] [420] of the print buffer [Cnt] (step S83).

The CPU 40 updates the 8×420 pointers of the master pointer table 423 in the following manner. FIG. 13 shows an LF value table 411 stored in the ROM 41. The resolution, a presence/absence of white information, and LF values are associated with each other in the LF value table 411. The presence/absence of white information indicates whether or not the image including the white ink image is to be printed. The LF values are associated with the respective values "1," "2," "3," and "0," which are remainders (remaining values) when Cnt is divided by "4."

Based on the print method specification information (shown in FIG. 6) of the header information of the print data stored in the reception buffer, the CPU 40 identifies whether the white ink image is included in the image to be printed based on the print data. When the print method specification information indicating that (1) only the white ink image is included, or (3) the white ink image and the color ink image are included is contained in the header information, the CPU 40 selects the LF values associated with "PRESENCE" for the presence/absence of white information. When the print method specification information indicating that (2) only the color ink image is included is contained in the header information, the CPU 40 selects the LF values associated with "ABSENCE" for the presence/absence of white information. The CPU 40 calculates the remainder when Cnt is divided by "4," and identifies the LF value corresponding to the calculated remainder. The CPU 40 adds the LF value identified on the basis of the LF value table 411 shown in FIG. 13 to the 8×420 pointers of the master pointer table 423 shown in FIG. 10 (step S85).

The CPU 40 identifies the 8×420 pieces of raster data indicated by the 8×420 pointers set in the read pointer table [8] [420] of the print buffer [Cnt] by the processing at step S83. The CPU 40 determines whether all of the bits of the identified 8×420 pieces of raster data are "0" (step S87). When all the bits of the 8×420 pieces of raster data are "0," the ink is not ejected from the ejection heads 35 when the processing is performed based on these data. When the CPU 40 determines that all the bits of the 8×420 pieces of raster data are "0" (yes at step S87), the CPU 40 adds the LF value added to the pointers by the processing at step S85 to the pre-scan LF amount of the print buffer [Cnt] (step S89). The CPU 40 adds "1" to Cnt and updates Cnt (step S91). The CPU 40 returns the processing to step S83. Based on the updated Cnt, the CPU 40 repeats steps S83 and S85. On the other hand, when the CPU 40 determines that all the bits of the 8×420 pieces of raster data are not "0" (no at step S87), the CPU 40 sets the LF value added to the pointers by the processing at step S85 to the post-scan LF amount of the print buffer [Cnt] (step S93). The CPU 40 advances the processing to step S101 shown in FIG. 12. The pre-scan LF amount and the post-scan LF amount calculated by the processing at steps S83 to S93 are used to skip the row in which the pixel array is not formed, and to identify a movement amount when relatively moving the carriage 34 in the sub scan direction to the row in which the pixel array is formed.

Figure 12:
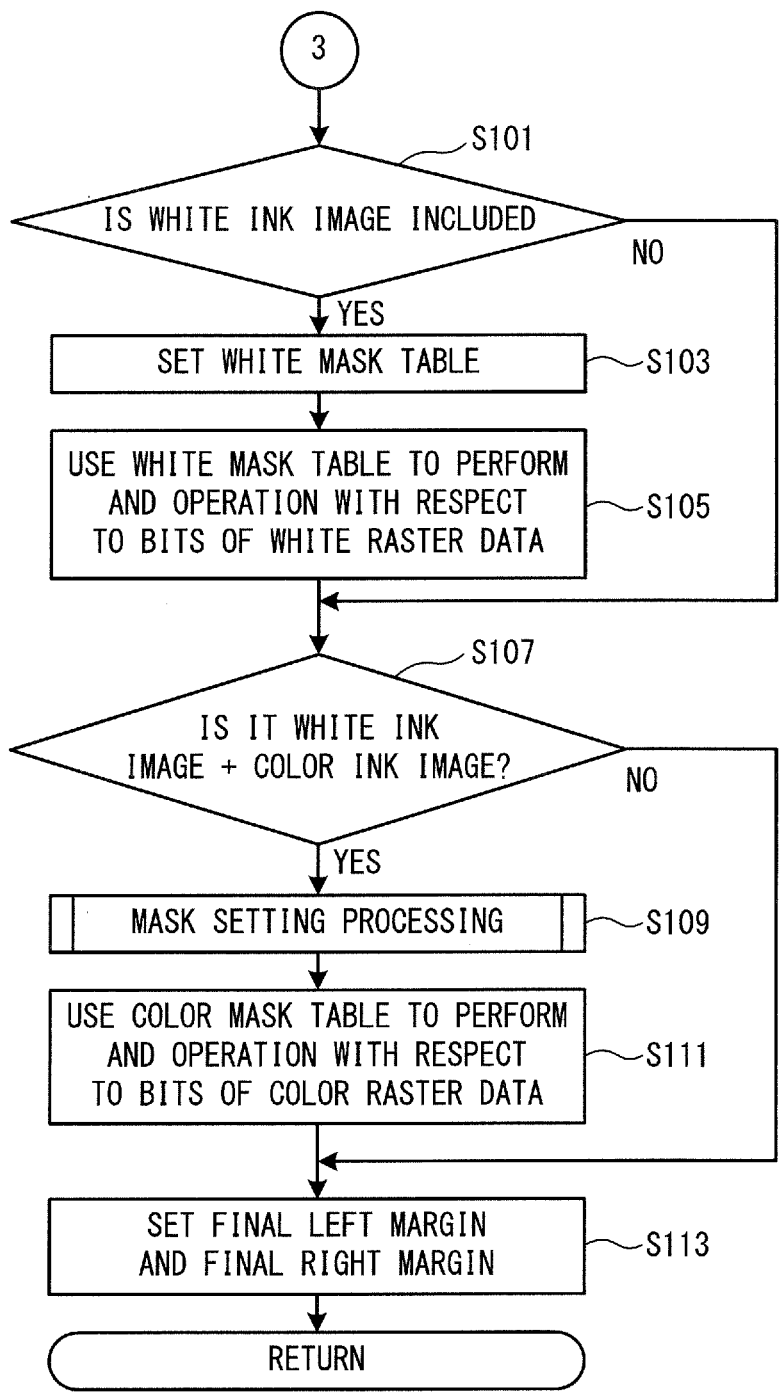
FIG. 12 is a flowchart of the data acquisition processing and is a continuation of FIG. 11.

As shown in FIG. 12, the CPU 40 determines whether, as the print method specification information, the information indicating that (1) only the white ink image is included, or (3) the white ink image and the color ink image are included, is contained in the header information of the print data stored in the reception buffer (step S101). When the CPU 40 determines that the information indicating that (2) only the color ink image is included is stored as the print method specification information (no at step S101), the CPU 40 advances the processing to step S107.

When the CPU 40 determines that the information indicating (1) or (3) is stored as the print method specification information (yes at step S101), the CPU 40 sets "0xEEEE" ("1110111011101110") in white mask tables [1] to [60] stored in the RAM 42 as mask values, and sets "0x1111" (0001000100010001) in white mask tables [361] to [420] as mask values (step S103).

The CPU 40 identifies the 8×420 pieces of raster data indicated by the 8×420 pointers set in the read pointer table [8] [420] of the print buffer [Cnt]. From among the identified raster data, the CPU 40 selects the 4×420 pieces of raster data corresponding to the four ejection heads 35W that eject the white ink. From among the selected 4×420 pieces of raster data, the CPU 40 performs an AND operation with respect to each of the bits of raster data corresponding to the nozzles [1] to [60] and the mask values "0xEEEE" set for each of the white mask tables [1] to [60] (step S105). From among the selected 4×420 pieces of raster data, the CPU 40 performs the AND operation with respect to each of the bits of raster data corresponding to the nozzles [361] to [420] and the mask values "0x1111" set for each of the white mask tables [361] to [420] (step S105). When the number of bits of the raster data is larger than "16," the CPU 40 repeatedly applies the values set in the white mask tables to the bits from the 17-th bit of the raster data onward and performs the AND operation. The CPU 40 advances the processing to step S107.

The CPU 40 determines whether, as the print method specification information, the information indicating that (3) the white ink image and the color ink image are included is stored in the header information of the print data stored in the reception buffer (step S107). When the CPU 40 determines that the information indicating (1) only the white ink image is included, or (2) only the color ink image is included is stored as the print method specification information (no at step S107), the CPU 40 advances the processing to step S113.

When the CPU 40 determines that the information indicating (3) is stored as the print method specification information (yes at step S107), the CPU 40 identifies the 8×420 pieces of raster data indicated by the 8×420 pointers set in the read pointer table [8] [420] of the print buffer [Cnt]. Based on the identified raster data, the CPU 40 performs mask setting processing shown in FIG. 14 (step S109).

The mask setting processing will be explained with reference to FIG. 14. In the mask setting processing, of the identified raster data, the 4×420 pieces of raster data corresponding to the ejection heads 35C, 35M, 35Y, and 35K that eject the color inks are masked. The CPU 40 performs first determination processing shown in FIG. 15 (step S121). The first determination processing will be explained with reference to FIG. 15. The CPU 40 determines whether a total of the number of bits (hereinafter referred to as a "total bit number") of each of the 4×420 pieces of raster data corresponding to the ejection heads 35C, 35M, 35Y, and 35K is equal to or less than "16" (step S131). When the CPU 40 determines that the total bit number is equal to or less than "16" (yes at step S131), the CPU 40 sets, as an application number, a quotient value that is obtained by dividing the total bit number by "2" (step S133). The application number is the number of a stage that is to be applied from the master mask table 412 shown in FIG. 16. Note that the quotient value is rounded up to the nearest integer. A range from which the application number can be taken is "1 to 8." The application number indicates the number of stages (1 to 8) of gradation in a partial multi-pass method. The CPU 40 advances the processing to step S137.

The master mask table 412 will be explained with reference to FIG. 16. "0" or "1" is set in the master mask table 412 as mask values corresponding to each of the 16 bits of the raster data. The mask values are associated with the stages "1" to "8." With respect to the mask values of each of the stages, ratios of "1" and "0" are "1:15" (stage "1"), "1:7" (stage "2"), "3:13" (stage "3"), "1:3" (stage "4"), "5:11" (stage "5"), "3:5" (stage "6"), "7:9" (stage "7"), and "1:1" (stage "8"). When the mask value of each of the stages is expressed as a hexadecimal number, "0x8000" (stage "1"), "0x2020" (stage "2"), "0x0842" (stage "3"), "0x1111" (stage "4"), "0x2492" (stage "5"), "0x294A" (stage "6"), "0x5515" (stage "7"), and "0x5555" (stage "8") are obtained.

Figure 14:
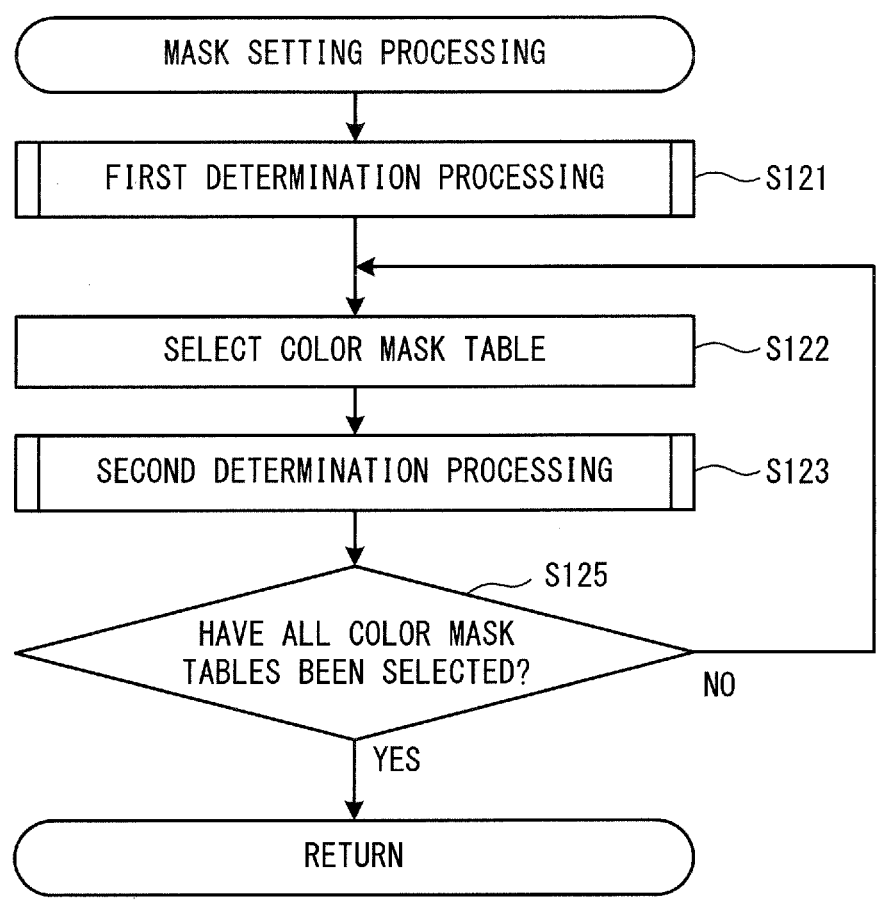
FIG. 14 is a flowchart of mask setting processing.
Figure 15:
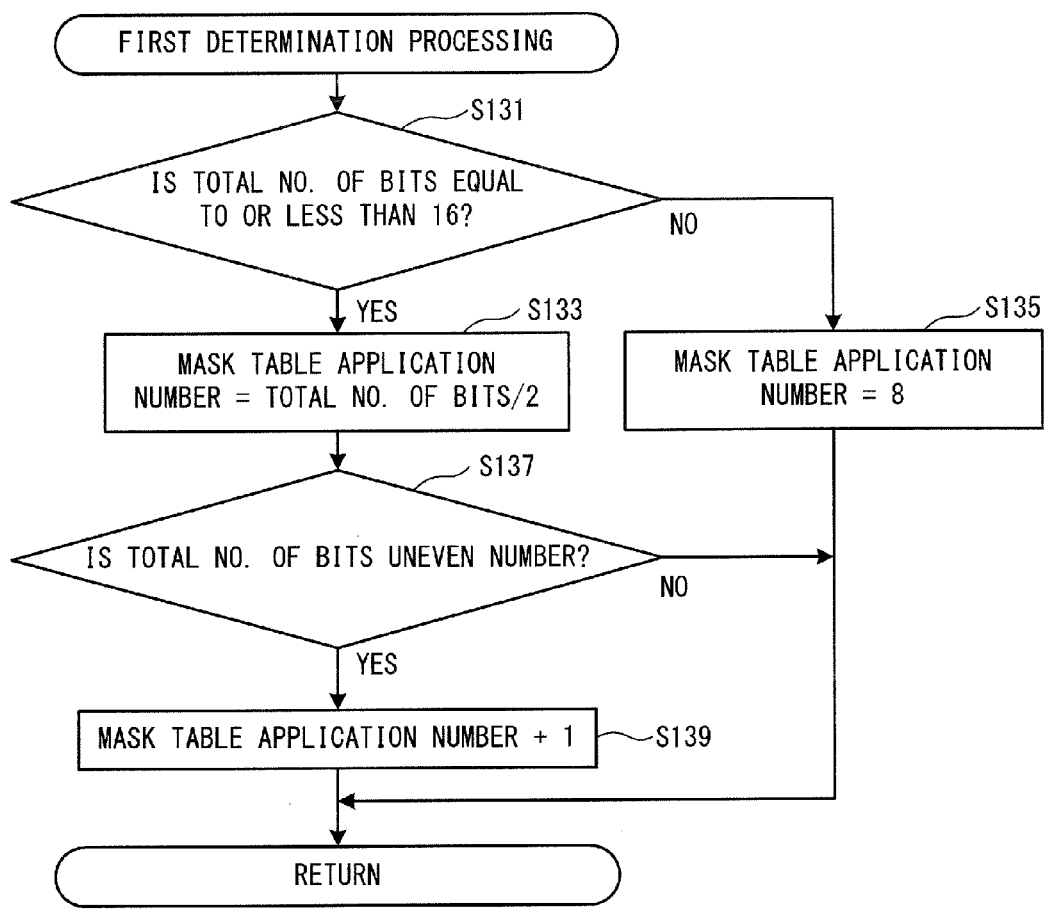
FIG. 15 is a flowchart of first determination processing.

As shown in FIG. 15, the CPU 40 determines whether the total bit number of each of the 4×420 pieces of raster data corresponding to the ejection heads 35C, 35M, 35Y, and 35K that eject the color inks is an uneven number (step S137). When the CPU 40 determines that the total bit number is an uneven number (yes at step S137), the CPU 40 adds "1" to the application number set by the processing at step S133 (step S139). The CPU 40 ends the first determination processing and returns the processing to the mask setting processing shown in FIG. 14. When the CPU 40 determines that the total bit number is not an uneven number (no at step S137), the CPU 40 ends the first determination processing and returns the processing to the mask setting processing shown in FIG. 14. When the CPU 40 determines that the total bit number of each of the 4×420 pieces of raster data corresponding to the ejection heads 35C, 35M, 35Y, and 35K that eject the color inks is not equal to or less than "16" (no at step S131), the CPU 40 sets "8" as the application number when the master mask table 412 is applied (step S135). The CPU 40 ends the first determination processing and returns the processing to the mask setting processing shown in FIG. 14.

As shown in FIG. 14, after ending the first determination processing (step S121), the CPU 40 selects one of the color mask tables [1] to [420] stored in the RAM 42 (step S122). The CPU 40 performs second determination processing shown in FIG. 17 (step S123).

Figure 17:
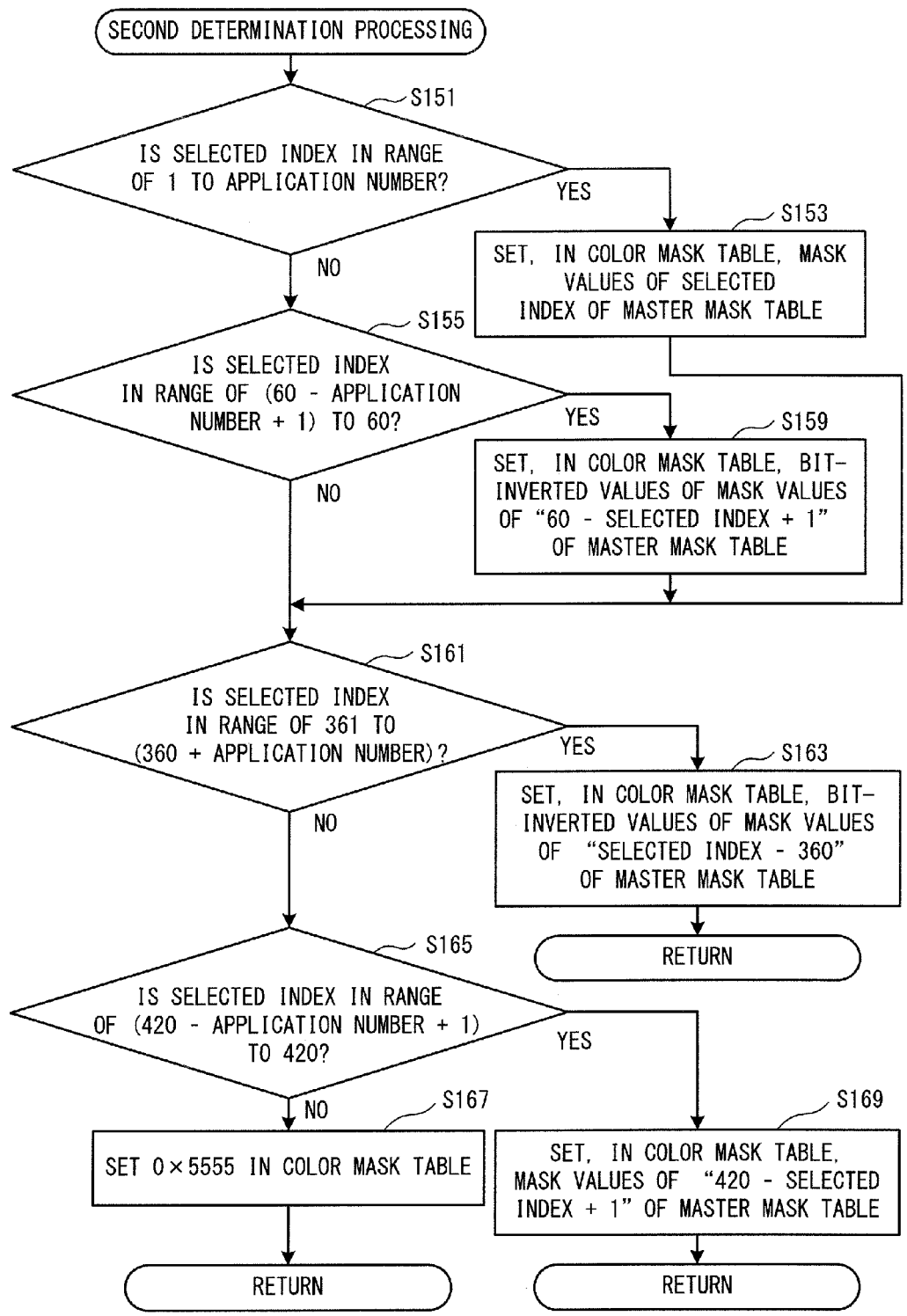
FIG. 17 is a flowchart of second determination processing.

The second determination processing will be explained with reference to FIG. 17. Below, an index of the color mask table selected by the processing at step S122 will be referred to as a "selected index." A range from which the selected index can be taken is "1 to 420." The selected index indicates a nozzle number "1 to 420" when the mask for 16 bits in the main scan direction is set for each nozzle. The CPU 40 determines whether the selected index is within a range from [1] to the [application number] determined in the first determination processing (step S151). When the CPU 40 determines that the selected index is within the range of [1] to the [application number] (yes at step S151), the CPU 40 sets, in the selected color mask table, mask values corresponding to the same stage as the selected index, of the master mask table 412 shown in FIG. 16 (step S153). The set color mask table is used when the color ink is ejected from the "1-st to application number-th" nozzles 36, from among the 420 nozzles 36 from which the color ink is ejected. For example, when the mask values of the indices [1] to [8] of the color mask table set when the application number is 8 are expressed as hexadecimal numbers, they are, respectively, "0x8000" (index [1]), "0x2020" (index [2]), "0x0842" (index [3]), "0x1111" (index [4]), "0x2492" (index [5]), "0x294A" (index [6]), "0x5515" (index [7]), and "0x5555" (index [8]). For the indices [1] to [8] of the color mask table, ratios of "1" and "0" are, respectively, "1:15" (index [1]), "1:7" (index [2]), "3:13" (index [3]), "1:3" (index [4]), "5:11" (index [5]), "3:5" (index [6]), "7:9" (index [7]), and "1:1" (index [8]). The CPU 40 advances the processing to step S161.

When the CPU 40 determines that the selected index is not within the range from [1] to the [application number] (no at step S151), the CPU 40 determines whether the selected index is within a range from [60−application number+1] to [60] (step S155). When the CPU 40 determines that the selected index is within the range from [60−application number+1] to [60] (yes at step S155), the CPU 40 sets, in the selected color mask table, bit-inverted values of the mask values corresponding to the "60−selected index+1" stage, of the master mask table 412 (step S159). The set color mask table is used when the color ink is ejected from the "(60−application number+1)-th to 60-th" nozzles 36, from among the 420 nozzles 36 from which the color ink is ejected. For example, when the mask values of the indices [53] to [60] of the color mask table set when the application number is 8 are expressed as hexadecimal numbers, they are, respectively, "0xAAAA" (index [53]), "0xAAEA" (index [54]), "0xD6B5" (index [55]), "0xDB6D" (index [56]), "0xEEEE" (index [57]), "0xF7BD" (index [58]), "0xDFDF" (index [59]), and "0x7FFF" (index [60]). For the indices [53] to [60] of the color mask table, ratios of "1" and "0" are, respectively, "1:1" (index [53]), "9:7" (index [54]), "5:3" (index [55]), "11:5" (index [56]), "3:1" (index [57]), "13:3" (index [58]), "7:1" (index [59]), and "15:1" (index [60]). The CPU 40 advances the processing to step S161. When the CPU 40 determines that the selected index is not within the range from [60−application number+1] to [60] (no at step S155), the CPU 40 advances the processing to step S161.

The CPU 40 determines whether the selected index is within a range from [361] to [360+application number] (step S161). When the CPU 40 determines that the selected index is within the range from [361] to [360+application number] (yes at step S161), the CPU 40 sets, in the selected color mask table, bit-inverted values of the mask values corresponding to the same stage as "selected index−360," of the master mask table 412 (step S163). The set color mask table is used when the color ink is ejected from the "361-st to (360+application number)-th" nozzles 36, from among the 420 nozzles 36 from which the color ink is ejected. For example, when the mask values of the indices [361] to [368] of the color mask table set when the application number is 8 are expressed as hexadecimal numbers, they are, respectively, "0x7FFF" (index [361]), "0xDFDF" (index [362]), "0xF7BD" (index [363]), "0xEEEE" (index [364]), "0xDB6D" (index [365]), "0xD6B5" (index [366]), "0xAAEA" (index [367]), and "0xAAAA" (index [368]). For the indices [361] to [368] of the color mask table, ratios of "1" and "0" are, respectively, "15:1" (index [361]), "7:1" (index [362]), "13:3" (index [363]), "3:1" (index [364]), "11:5" (index [365]), "5:3" (index [366]), "9:7" (index [367]), and "1:1" (index [368]). The CPU 40 ends the second determination processing and returns the processing to the mask setting processing shown in FIG. 14.

When the CPU 40 determines that the selected index is not within the range from [361] to [360+application number] (no at step S161), the CPU 40 determines whether the selected index is within a range from [420−application number+1] to [420] (step S165). When the CPU 40 determines that the selected index is within the range from [420−application number+1] to [420] (yes at step S165), the CPU 40 sets, in the selected color mask table, mask values corresponding to the stage "420−selected index+1" of the master mask table 412 (step S169). The set color mask table is used when the color ink is ejected from the "(420−application number+1)-th to 420-th" nozzles 36, from among the 420 nozzles 36 from which the color ink is ejected. For example, when the mask values of the indices [413] to [420] of the color mask table set when the application number is 8 are expressed as hexadecimal numbers, they are, respectively, "0x5555" (index [413]), "0x5515" (index [414]), "0x294A" (index [415]), "0x2492" (index [416]), "0x1111" (index [417]), "0x0842" (index [418]), "0x2020" (index [419]), and "0x8000" (index [420]). For the indices [413] to [420] of the color mask table, ratios of "1" and "0" are, respectively, "1:1" (index [413]), "7:9" (index [414]), "3:5" (index [415]), "5:11" (index [416]), "1:3" (index [417]), "3:13" (index [418]), "1:7" (index [419]), and "1:15" (index [420]). The CPU 40 ends the second determination processing and returns the processing to the mask setting processing shown in FIG. 14. When the CPU 40 determines that the selected index is not within the range from [420−application number+1] to [420] (no at step S165), the CPU 40 sets "0x5555" (0101010101010101) in the selected color mask table (step S167). The CPU 40 ends the second determination processing and returns the processing to the mask setting processing shown in FIG. 14.

As shown in FIG. 14, after ending the second determination processing (step S123), the CPU 40 determines whether all the color mask tables [1] to [420] have been selected by the processing at step S122 (step S125). When the CPU 40 determines that not all the color mask tables [1] to [420] have been selected (no at step S125), the CPU 40 returns the processing to step S122. From among the color mask tables [1] to [420], the CPU 40 selects the color mask tables that have not been selected and repeatedly performs the second determination processing (step S123). When the CPU 40 determines that all the color mask tables [1] to [420] have been selected by the processing at step S122 (yes at step S125), the CPU 40 ends the mask setting processing and returns the processing to the data acquisition processing shown in FIG. 12.

As shown in FIG. 12, after ending the mask setting processing (step S109), the CPU 40 identifies the 8×420 pieces of raster data indicated by the 8×420 pointers set in the read pointer table [8] [420] of the print buffer [Cnt]. From among the identified raster data, the CPU 40 selects the 4×420 pieces of raster data corresponding to the ejection heads 35C, 35M, 35Y, and 35K that eject the color inks. From the selected 4×420 pieces of raster data, the CPU 40 further selects the 420 pieces of raster data for each color. The CPU 40 performs the AND operation with respect to each of the bits of the selected 420 pieces of raster data and the mask values set for each of the color mask tables [1] to [420]. The CPU 40 performs the above-described processing with respect to each set of the 420 pieces of raster data corresponding to each of the colors (step S111). The CPU 40 advances the processing to step S113.

The CPU 40 identifies the 8×420 pieces of raster data indicated by the 8×420 pointers set in the read pointer table [8] [420] of the print buffer [Cnt]. From among the raster information stored in the expansion buffer, the CPU 40 extracts all of the left margins and the right margins associated with the identified raster data. The CPU 40 sets, as a final left margin of the print buffer [Cnt], the smallest left margin from among all of the left margins. The CPU 40 sets, as a final right margin of the print buffer [Cnt], the smallest right margin from among all of the right margins (step S113). The CPU 40 ends the data acquisition processing and returns the processing to the main processing shown in FIG. 7.

As shown in FIG. 7, after ending the data acquisition processing (step S17), the CPU 40 acquires the pre-scan LF amount of the print buffer [Cnt]. The CPU 40 starts processing to move the platen 39 in the sub scan direction by the acquired pre-scan LF amount (step S19). The CPU 40 opens the caps covering the 420 nozzles 36 of each of the four ejection heads 35W, and the ejection heads 35C, 35M, 35Y, and 35K (step S21). The CPU 40 moves the carriage 34 to a flushing position (step S23). The flushing position is a position at which a flushing receptacle (not shown in the drawings) is provided.

The CPU 40 determines whether the movement of the platen 39 by the pre-scan LF amount started by the processing at step S19 is complete (step S25). When the CPU 40 determines that the movement of the platen 39 by the pre-scan LF amount is not complete (no at step S25), the CPU 40 returns the processing to step S25. The CPU 40 continuously monitors whether the movement of the platen 39 by the pre-scan LF amount is complete. When the CPU 40 determines that the movement of the platen 39 by the pre-scan LF amount is complete (yes at step S25), flushing processing is performed (step S27).

After ending the flushing processing (step S27), the CPU 40 adds "1" to Cnt (step S29). Based on Cnt to which "1" has been added, the CPU 40 performs the data acquisition processing shown in FIG. 11 (step S31). The data acquisition processing is the same as the data acquisition processing performed at step S17, and an explanation thereof is thus omitted here. The CPU 40 advances the processing to step S41 shown in FIG. 8.

Figure 8:
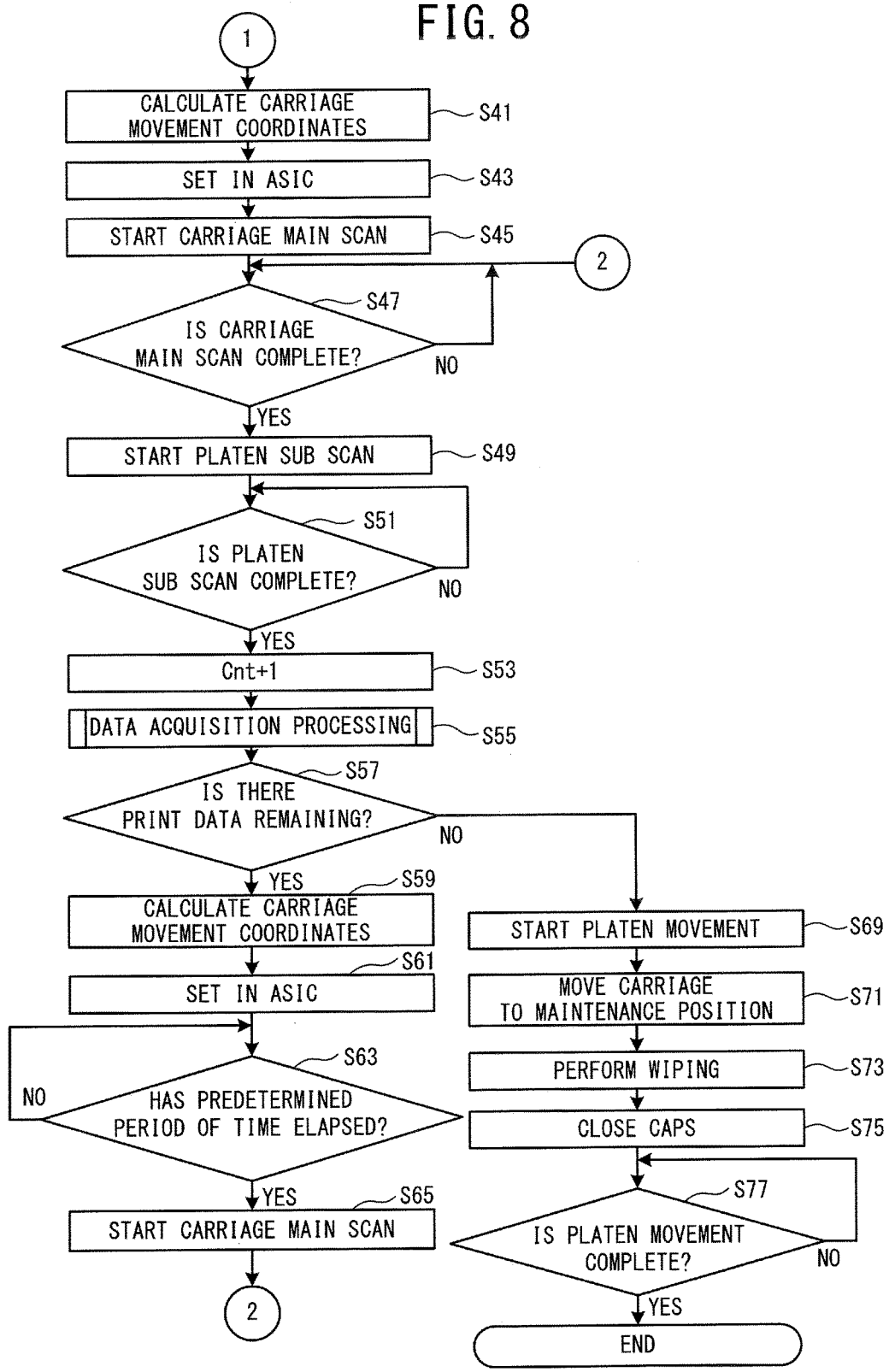
FIG. 8 is a flowchart of the main processing and is a continuation of FIG. 7.

As shown in FIG. 8, after ending step S31 of the data acquisition processing shown in FIG. 7, the CPU 40 selects, in order of the indices, the print buffer that has not been used in ejection control of the ink that will be described later, from among the print buffers. The CPU 40 acquires the final left margin and the final right margin of the selected print buffer. The CPU 40 calculates coordinates of each of positions indicated by the acquired final left margin and final right margin, as coordinates of a carriage movement origin and a carriage movement destination (step S41). The CPU 40 sets the calculated coordinates in a storage portion of the ASIC 43 shown in FIG. 3 (step S43). The CPU 40 sets the read pointer table of the selected print buffer in the storage portion of the ASIC 43 (step S43). The CPU 40 sets the main scan direction, as a print direction, in the storage portion of the ASIC 43 (step S43).

By outputting a signal to the ASIC 43, the CPU 40 starts movement of the carriage 34 in the main scan direction (step S45). The ASIC 43 controls the head drive portion 44 and the motor drive portion 45 shown in FIG. 3. As a result of the control of the ASIC 43, the motor drive portion 45 starts the movement of the carriage 34 in the main scan direction. As a result of the control of the ASIC 43, the head drive portion 44 causes the white ink and the color inks to be ejected from the nozzles 36 at the intervals of D/4 in the main scan direction. The ASIC 43 controls the head drive portion 44, and causes the ink to be ejected from the ejection head 35 at a timing at which the bit of the raster data is "1." In contrast, the ASIC 43 controls the head drive portion 44 and prohibits the ink from being ejected from the ejection head 35 at a timing at which the bit of the raster data is "0."

The CPU 40 determines whether the movement of the carriage 34 in the main scan direction is complete (step S47). When the CPU 40 determines that the movement of the carriage 34 in the main scan direction is not complete (no at step S47), the CPU 40 returns the processing to step S47. When the CPU 40 determines that the movement of the carriage 34 in the main scan direction is complete (yes at step S47), the CPU 40 advances the processing to step S49.

The CPU 40 acquires the pre-scan LF amount of the selected print buffer. The CPU 40 acquires the post-scan LF amount of the print buffer of the index obtained by adding "1" to the index of the selected print buffer. The CPU 40 adds together the acquired pre-scan LF amount and post-scan LF amount and calculates the movement amount. The CPU 40 starts the processing to move the platen 39 in the sub scan direction by the movement amount (step S49). The CPU 40 determines whether the movement of the platen 39 in the sub scan direction is complete (step S51). When the CPU 40 determines that the movement of the platen 39 in the sub scan direction is not complete (no at step S51), the CPU 40 returns the processing to step S51. When the CPU 40 determines that the movement of the platen 39 in the sub scan direction is complete (yes at step S51), the CPU 40 advances the processing to step S53.

The CPU 40 adds "1" to Cnt (step S53). Based on Cnt to which "1" has been added, the CPU 40 performs the data acquisition processing shown in FIG. 11 (step S55). The data acquisition processing is the same as the data acquisition processing performed at step S17 and step S31 shown in FIG. 7, and an explanation thereof is thus omitted here. The CPU 40 advances the processing to step S57.

After ending the data acquisition processing (step S55), the CPU 40 determines whether a print buffer is remaining that has not been used in the ejection control of the ink (step S57). When the CPU 40 determines that the print buffer that has not been used in the ejection control of the ink is remaining (yes at step S57), the CPU 40 advances the processing to step S59. The CPU 40 selects the print buffer that has not been used in the ejection control of the ink, in order of the indices. The CPU 40 acquires the final left margin and the final right margin of the selected print buffer. The CPU 40 calculates coordinates of each of positions indicated by the acquired final left margin and final right margin, as coordinates of the carriage movement origin and the carriage movement destination (step S59). The CPU 40 sets the calculated coordinates in the storage portion of the ASIC 43 shown in FIG. 3 (step S61). The CPU 40 sets the read pointer table of the selected print buffer in the storage portion of the ASIC 43, and sets the main scan direction, as the print direction, in the storage portion of the ASIC 43 (step S61).

The CPU 40 determines whether a predetermined period of time has elapsed from the determination, at step S47, that the movement of the carriage 34 in the main scan direction is complete (step S63). When the CPU 40 determines that the predetermined period of time has not elapsed (no at step S63), the CPU 40 returns the processing to step S63. When the CPU 40 determines that the predetermined period of time has elapsed (yes at step S63), the CPU 40 advances the processing to step S65. By outputting a signal to the ASIC 43, the CPU 40 starts the movement of the carriage 34 in the main scan direction (step S65). The CPU 40 returns the processing to step S47.

When the CPU 40 determines that the print buffer that has not been used in the ejection control of the ink is not remaining (no at step S57), the CPU 40 advances the processing to step S69. The CPU 40 starts processing to move the platen 39 to the position furthermost to the front side (step S69). The CPU 40 moves the carriage 34 to a maintenance position (step S71). The maintenance position is a position in which a wiper (not shown in the drawings) is provided. The CPU 40 performs wiping (step S73). The wiping is processing to scrape ink that has adhered to the nozzles 36, using a wiper. The CPU 40 causes all of the ejection heads 35 to be in a state of being covered by the caps (step S75). The CPU 40 determines whether the movement of the platen 39 is complete (step S77). When the CPU 40 determines that the movement of the platen 39 is not complete (no at step S77), the CPU 40 returns the processing to step S77. When the CPU 40 determines that the movement of the platen 39 is complete (yes at step S77), the CPU 40 ends the main processing.

Main Effects and Benefits of the Present Disclosure

As described above, the print device 30 has the four ejection heads 35W that eject the white ink, and the ejection heads 35C, 35M, 35Y, and 35K that eject the color inks. Of the 420 nozzles 36 of each of the four ejection heads 35W, the white ink is appropriately ejected from the 1-st to 360-th nozzles 36, in order from the front side. However, there is a case in which the white ink is not appropriately ejected from the 361-st to 420-th nozzles 36, due to clogging. The color ink is appropriately ejected from the 1-st to 420-th nozzles 36 of the ejection heads 35C, 35M, 35Y, and 35K.

In the above-described case, based on the print buffer [1], the CPU 40 of the print device 30 moves the ejection heads 35 in the main scan direction and causes the white ink and the color ink to be ejected from the nozzles 36 at the intervals of D/4 in the main scan direction (step S45). Next, the CPU 40 relatively moves the ejection heads 35 in the sub scan direction (step S49). Based on the print buffers [2] to [4], the CPU 40 moves the ejection heads 35 in the main scan direction and causes the white ink and the color ink to be ejected from the nozzles 36 (step S45). The CPU 40 calculates the pointers in the read pointer table [8] [420] of each of the print buffers [2] to [4] by adding the LF value "359" of the LF value table 411 shown in FIG. 13 to each of the pointers (step S85). The CPU 40 calculates the movement amount of the ejection heads 35 in the sub scan direction by the processing at step S49 on the basis of the LF value "359." A unit length of the LF value is the interval D/4 between the pixel arrays. Thus, the CPU 40 ejects the ink based on the print buffers [2] to [4] while relatively moving the ejection heads 35 in the sub scan direction in increments of a distance (359/4×D) that excludes integral multiples of D, which is the distance between the adjacent nozzles 36. As shown in FIG. 5, the pixel arrays of the white ink and the color ink formed in this case are arranged at intervals of D/4 in the sub scan direction.

The CPU 40 causes the white ink and the color ink to be ejected from the nozzles 36 while moving the ejection heads 35 in the main scan direction based on the print buffer [5] (step S45). The CPU 40 calculates the pointers of the read pointer table [8] [420] of the print buffer [5] by adding the LF value "363" of the LF value table 411 shown in FIG. 13 to the read pointers of the print buffer [4] (step S85). The CPU 40 calculates the movement amount of the ejection heads 35 in the sub scan direction by the processing at step S49 on the basis of the LF value "363." Thus, the CPU 40 relatively moves the ejection heads 35 by an amount of (359+359+359+363)/4×D=360D in the sub scan direction, from the position of the ejection heads 35 at which the ink was ejected based on the print buffer [1], and ejects the ink based on the print buffer [5]. 360D corresponds to a length in the sub scan direction of the area in which the 1-st to 360-th nozzles 36, which appropriately eject the white ink among the ejection heads 35W, are arranged.

When the white ink is not ejected from the 361-st to 420-th nozzles 36 of the ejection heads 35W, the position of the pixel array formed by the white ink being ejected on the basis of the print buffer [5] does not match the positions of the pixel arrays formed by the white ink being ejected on the basis of the print buffers [1] to [4]. Meanwhile, the position of the pixel array formed by the color ink being ejected from the 1-st to 60-th nozzles 36 on the basis of the print buffer [5] matches the position of the pixel array formed by the color ink being ejected from the 361-st to 420-th nozzles 36 on the basis of the print buffer [1]. In other words, based on the multi-pass method, the CPU 40 forms 60 pixel arrays corresponding to the 1-st to 60-th and to the 361-st to 420-th nozzles 36, by combining the color ink dots ejected from the two different nozzles 36.

In the above-described case, even when the white ink is not ejected from the 361-st to 420-th nozzles 36 of the ejection heads 35W, the CPU 40 can cause the white ink pixel arrays to be aligned in the sub scan direction without any gaps between them. At the same time as causing the white ink to be ejected from the nozzles 36 of the ejection heads 35W, the CPU 40 can cause the color ink pixel arrays to be aligned in the sub scan direction without any gaps between them by causing the color inks to be ejected from the nozzles 36 of the ejection heads 35C, 35M, 35Y, and 35K. As a result, the CPU 40 resolves any omissions in the pixel arrays of the white ink or the color ink, and thus there is no need to increase a number of scans in the main scan direction. The CPU 40 can thus suppress a time required to form the white ink image and the color ink image from becoming relatively long.

The CPU 40 sets the mask with respect to the raster data to eject the color inks from the nozzles 36 of the ejection heads 35C, 35M, 35Y, and 35K (step S109). Specifically, the CPU 40 sets, on the basis of the mask values of the master mask table 412 shown in FIG. 16, the color mask tables used when causing the color inks to be ejected from the 1-st to 60-th nozzles 36 of the ejection heads 35C, 35M, 35Y, and 35K (step S153 and step S159). Meanwhile, the CPU 40 sets inverted values of the mask values of the master mask table 412 as the color mask tables used when causing the color inks to be ejected from the 361-st to 420-th nozzles 36 of the ejection heads 35C, 35M, 35Y, and 35K (step S163 and step S169). The CPU 40 performs the AND operation with respect to the mask values of the set color mask tables and each of the bits of the raster data (step S111). Thus, by performing the control based on the raster data, the CPU 40 can control the ejection of the ink such that the positions of the color ink dots ejected from the 361-st to 420-th nozzles 36 on the basis of the print buffer [1] and the positions of the color ink dots ejected from the 1-st to 60-th nozzles 36 on the basis of the print buffer [5] are different.

The mask values of the color mask tables respectively corresponding to the 1-st to 60-th, and to the 361-st to 420-th nozzles 36 are inverted. As a result, the number of color ink dots included in each of the 60 pixel arrays formed using the multi-pass method matches the number of color ink dots included in the pixel arrays not formed using the multi-pass method. Thus, the following relationship is established. For example, a number of dots obtained by adding the number of dots in each of the pixel arrays of the color ink ejected from the 361-st to 420-th nozzles 36 on the basis of the print buffer [1] to the number of dots in each of the pixel arrays of the color ink ejected from the 1-st to 60-th nozzles 36 on the basis of the print buffer [5] is defined as an "added number." The defined added number matches the number of dots in each of the pixel arrays of the color ink ejected from the 61-st to 360-th nozzles 36 based on the print buffers [2] to [4].

When it is assumed that the amount of ink in each of the dots is the same, the following relationship is established. For example, an amount obtained by adding an amount of the color ink in each of the pixel arrays formed by the 361-st to 420-th nozzles 36 based on the print buffer [1] to an amount of the color ink in each of the pixel arrays formed by the 1-st to 60-th nozzles 36 based on the print buffer [5] is defined as an "added amount." The defined added amount is approximately the same as an amount of the color ink when the pixel arrays are formed by the 61-st to 360-th nozzles 36 based on the print buffers [2] to [4].

Thus, the CPU 40 can suppress a density difference between each of the pixel arrays of the color ink. Therefore, the CPU 40 can suppress an unevenness in the density in the sub scan direction of the color ink image that is formed. As described above, the CPU 40 controls the ejection of the color inks using the color mask tables and can thus suppress the unevenness in the density in the sub scan direction of the color ink image using a simple method.

In the master mask table 412 shown in FIG. 16, the ratios of the mask values of "1" and "0" change from "1:15" to "1:1" in accordance with the increase in the stages. Thus, by setting the color mask tables in accordance with step S153 shown in FIG. 17, the number of ejection times that the color ink is ejected from each of the 1-st to 8-th nozzles 36 becomes greater in order from the 1-st to the 8-th nozzle 36. The number of ejection times that the color ink is ejected from the 8-th nozzle 36 is half the number of dots forming a single one of the pixel arrays. By setting the color mask tables in accordance with step S159, the number of ejection times that the color ink is ejected from each of the 53-rd to 60-th nozzles 36 becomes greater in order from the 53-rd to 60-th nozzle 36. On the other hand, at step S163, the inverted values of the mask values of the master mask table 412 are set in the color mask tables. Thus, the number of ejection times that the color ink is ejected from each of the 361-st to 368-th nozzles 36 becomes smaller in order from the 361-st to the 368-th nozzle 36. The number of ejection times that the color ink is ejected from the 368-th nozzle 36 is half the number of dots forming a single one of the pixel arrays. By setting the color mask tables in accordance with step S169, the number of ejection times that the color ink is ejected from each of the 413-rd to 420-th nozzles 36 becomes smaller in order from the 413-rd to 420-th nozzle 36.

In the multi-pass method in which the single pixel array is formed by the color ink dots ejected from the two nozzles 36, there is a case in which an ejection direction of the ink from the two nozzles 36 slightly differs. When the ejection heads 35 are moved in the sub scan direction, there is a case in which an error occurs in the movement distance. In these cases, the plurality of dots included in the single pixel array formed by the multi-pass method may be misaligned due to the differences in the nozzles 36. At this time, there is a case in which stripes occur in a boundary section between the area including the pixel array formed by the multi-pass method and the area not including the pixel array formed by the multi-pass method, resulting in a deterioration in the quality of the image. In particular, when there is a large change in the ratio of the number of ejection times of each of the two nozzles 36, stripes are more likely to be conspicuous, and the quality of the image deteriorates significantly.

With respect to this issue, as described above, the CPU 40 sequentially changes the ratios of the number of ejection times of each of the two nozzles 36 that form the single pixel array. An example will be described in which the pixel array is formed by the multi-pass method by the ink dots ejected, respectively, from the 1-st to 60-th nozzles 36 and the 361-st to 420-th nozzles 36. When the pixel array is formed using the multi-pass method by the 1-st to 8-th nozzles 36 and the 361-st to 368-th nozzles 36, the ratios of the number of ink dots ejected from each one of the 1-st to 8-th nozzles 36 and each one of the 361-st to 368-th nozzles 36 change from "1:15" to "1:1." When the pixel array is formed using the multi-pass method by the 53-rd to 60-th nozzles 36 and the 413-rd to 420-th nozzles 36, the ratios of the number of ink dots ejected from each one of the 53-rd to 60-th nozzles 36 and each one of the 413-rd to 420-th nozzles 36 change from "1:1" to "15:1." In these cases, the boundary section between the area including the pixel array formed by the multi-pass method and the area not including the pixel array formed by the multi-pass method is even less likely to be conspicuous. The reason for this is that, in sections close to the boundary section between the two areas, the closer to the boundary section, the closer the ratios of the number of ink dots ejected from each of the two nozzles 36 (one of the 1-st to 60-th nozzles 36 and one of the 361-st to 420-th nozzles 36) forming the pixel array using the multi-pass method, are from "15:1" to "1:15." As a result, the pixel arrays formed using the multi-pass method are close to a state of the pixel arrays that are not formed using the multi-pass method. As a result, the CPU 40 can suppress the occurrence of stripes in the boundary section between the area including the pixel array formed by the multi-pass method and the area not including the pixel array formed by the multi-pass method, and can thus cause the boundary section to be less conspicuous.

When the white ink is ejected from the 361-st to 420-th nozzles 36 of the four ejection heads 35W that eject the white ink, in a similar manner to the color ink, the pixel array is formed by the multi-pass method using the white ink. In this case, the CPU 40 sets the mask with respect to the raster data to eject the white ink from the white ink ejection heads 35W. Specifically, the CPU 40 sets "0xEEEE" in the white mask tables [1] to [60] as the mask values, and sets "0x1111" in the white mask tables [361] to [420] as the mask values (step S103). The CPU 40 performs the AND operation with respect to the mask values of the set white mask tables and each of the bits of the raster data (step S105).

By performing the control based on the raster data, the CPU 40 causes the number of times that the white ink is ejected from the 1-st to 60-th nozzles 36 to be different to the number of times that the white ink is ejected from the 361-st to 420-th nozzles 36. Specifically, the CPU 40 sets the number of times that the white ink is ejected from the 1-st to 60-th nozzles 36 to be 75% of the total, and the number of times that the white ink is ejected from the 361-st to 420-th nozzles 36 to be 25% of the total. By setting the percentage of the number of ejection times from the 1-st to 60-th nozzles 36 to be higher than the percentage of the number of ejection times from the 361-st to 420-th nozzles 36 in this manner, the CPU 40 can appropriately form the white ink pixel arrays, even when the ejection amount of the white ink has become smaller due to clogging of the 361-st to 420-th nozzles 36. Alternatively, the CPU 40 sets the number of times that the white ink is ejected from the 1-st to 60-th nozzles 36 to be a constant 25% of the total, and sets the number of times that the white ink is ejected from the 361-st to 420-th nozzles 36 to be a constant 75% of the total. In other words, the CPU 40 makes constant the ratio between the number of times that the white ink is ejected from the 1-st to 60-th nozzles 36 and the number of times that the white ink is ejected from the 361-st to 420-th nozzles 36. As a result, the CPU 40 can easily control the ejection of the white ink from the nozzles 36.

Modified Examples

The present disclosure is not limited to the above-described embodiment, and various modifications are possible. In the above description, the print device 30 ejects the white ink from the nozzles 36 of the four ejection heads 35W. The print device 30 ejects the cyan, magenta, yellow, and black inks from the nozzles 36 of each of the ejection heads 35C, 35M, 35Y, and 35K. In contrast to this, the colors of the inks ejected from the nozzles 36 of the four ejection heads 35W and the ejection heads 35C, 35M, 35Y, and 35K may be colors that are different to the colors of the above-described embodiment.

In the above description, the number (eight) of the ejection heads 35, the number (420) of the nozzles 36, the distance (1/300 inch) between each of the plurality of nozzles 36, and the distance (150 mm) between the nozzles 36 of each of the four ejection heads 35W furthest to the rear side and the nozzles 36 of the each of the ejection heads 35C, 35M, 35Y, and 35K furthest to the front side are examples, and may be other numbers or values.

The arrangement of the four ejection heads 35W and the ejection heads 35C, 35M, 35Y, and 35K is not limited to the above-described example, and may be another arrangement. The number of the ejection heads 35W is not limited to four, and may be one to three, or may be five or more. The ejection head 35K need not necessarily be provided on the carriage 34. The number of nozzles 36 included in the four ejection heads 35W may be smaller than the number of nozzles 36 included in each of the ejection heads 35C, 35M, 35Y, and 35K. Of the 420 nozzles 36 of the ejection head 35W, the number of nozzles 36 in which clogging is likely to occur is not limited to 60 (the 361-st to 420-th nozzles 36), and may be another number.

The present disclosure can also be applied when the printing is performed by moving the platen 39 without moving the ejection heads 35. In other words, it is sufficient if the print device 30 causes the relative movement between the ejection heads 35 and the platen 39.

The LF values stored in the LF table 411 shown in FIG. 13 can be changed as appropriate. For example, the LF values corresponding to the remainder values "1," "2," and "3" can be changed as desired to a value other than 4n (n=1, 2, . . . ). By causing the LF value to be a value other than 4n, the CPU 40 can relatively move the ejection heads 35 in the sub scan direction in increments of a distance that excludes integral multiples of D. For example, when the LF values corresponding to the remainder values "1," "2," and "3" are denoted by Y, the LF value corresponding to a remainder value of "0" can be changed to X that satisfies a condition "(Y+Y+Y+X)/4=360D."

The CPU 40 causes the added amount of the amounts of color ink ejected from each of the two nozzles 36 forming the single pixel array by the multi-pass method and the amount of color ink ejected from the single nozzle 36 forming the single pixel array to be the same, by controlling the number of color ink dots. In contrast to this, the CPU 40 may control the amount of ink using a different method. For example, the CPU 40 may cause the amount of ink ejected from each of the nozzles 36 to be switched in a plurality of stages. Instead of controlling the number of ink dots, by controlling the amount of ink ejected, the CPU 40 may cause the added amount of the amounts of color ink ejected from each of the two nozzles 36 forming the single pixel array by the multi-pass method and the amount of color ink ejected from the single nozzle 36 forming the single pixel array to be the same.

The CPU 40 causes the positions of the color ink dots ejected from the 361-st to 420th nozzles 36 on the basis of the print buffer [1] to be different to the positions of the color ink dots ejected from the 1-st to 60-th nozzles 36 on the basis of the print buffer [5]. In contrast to this, the CPU 40 may cause at least some of the positions of the color ink dots ejected from the 361-st to 420-th nozzles 36 to match at least some of the positions of the color ink dots ejected from the 1-st to 60-th nozzles 36. Specifically, at least some of the color ink dots may be ejected so as to overlap on the same positions. In this case, the color mask tables may be set using a method other than that described above. For example, the color mask tables may be set using random numbers calculated using a known random number generating algorithm.

The CPU 40 causes the number of ejections of the color ink ejected from each of the 1-st to 8-th nozzles 36 to become smaller in order from the 1-st to 8-th nozzle 36. Further, the CPU 40 causes the number of ejections of the color ink ejected from each of the 53-rd to 60-th nozzles 36 to become greater in order from the 53-rd to 60-th nozzle 36. The CPU 40 causes the number of ejections of the color ink ejected from each of the 361-st to 368-th nozzles 36 to become greater in order from the 361-st to 368-th nozzle 36. Further, the CPU 40 causes the number of ejections of the color ink ejected from each of the 413-rd to 420-th nozzles 36 to become smaller in order from the 413-rd to 420-th nozzle 36. In contrast to this, the CPU 40 may set the number of ejections of the color ink from each of the 1-st to 420-th nozzles 36 to be constant for all of the nozzles 36.

The CPU 40 sets the number of times that the white ink is ejected from the 1-st to 60-th nozzles 36 to be 75% of the total, and the number of times that the white ink is ejected from the 361-st to 420-th nozzles 36 to be 25% of the total. In contrast to this, the CPU 40 may set percentages different to those described above as the percentages of each of the number of ejection times. The percentage of each of the number of ejection times may be set to match at 50%.

In the above-described embodiment, even when the clogging occurs in the 361-st to 420-th nozzles 36 of the ejection heads 35W from which the white ink is ejected, the movement amount of the ejection heads 35 in the sub scan direction is adjusted such that the white ink pixel arrays are arranged in the sub scan direction without any gaps between them. Specifically, the CPU 40 first relatively moves the ejection heads 35 in the sub scan direction three times in increments of (359/4×D), and forms the three pixel arrays. Next, the CPU 40 relatively moves the ejection heads 35 to a position separated by (360×D) in the sub scan direction from the position of the pixel array formed first among the three formed pixel arrays, and forms the single pixel array. Further, the color inks are ejected from the nozzles 36 of each of the ejection heads 35C, 35M, 35Y, and 35K at the same time as the white ink is ejected. In this case, some of the color ink pixel arrays are formed using the multi-pass method. Thus, the pixel arrays not formed using the multi-pass method and the pixel arrays formed using the multi-pass method are mixed together.

Below, the movement amount of the ejection heads 35 when the three pixel arrays are formed at the start is denoted by ((N1−1)/4×D). After that, when the single pixel array is formed, the movement amount of the ejection heads 35 from the position of the pixel array formed first among the three pixel arrays is denoted by N1×D. Of the 420 nozzles 36 of the white ink ejection heads 35W, N1 indicates the number of the 1-st to 360-th nozzles 36 of the ejection heads 35W in which the clogging is unlikely to occur. A total number of the nozzles 36 included in each of the ejection heads 35 is denoted by N. A value calculated by N−N1 is denoted by N2. Of the 420 nozzles 36 of the white ink ejection heads 35W, N2 indicates the number of the 361-st to 420-th nozzles 36 of the ejection heads 35W in which the clogging is likely to occur.

Figure 18:
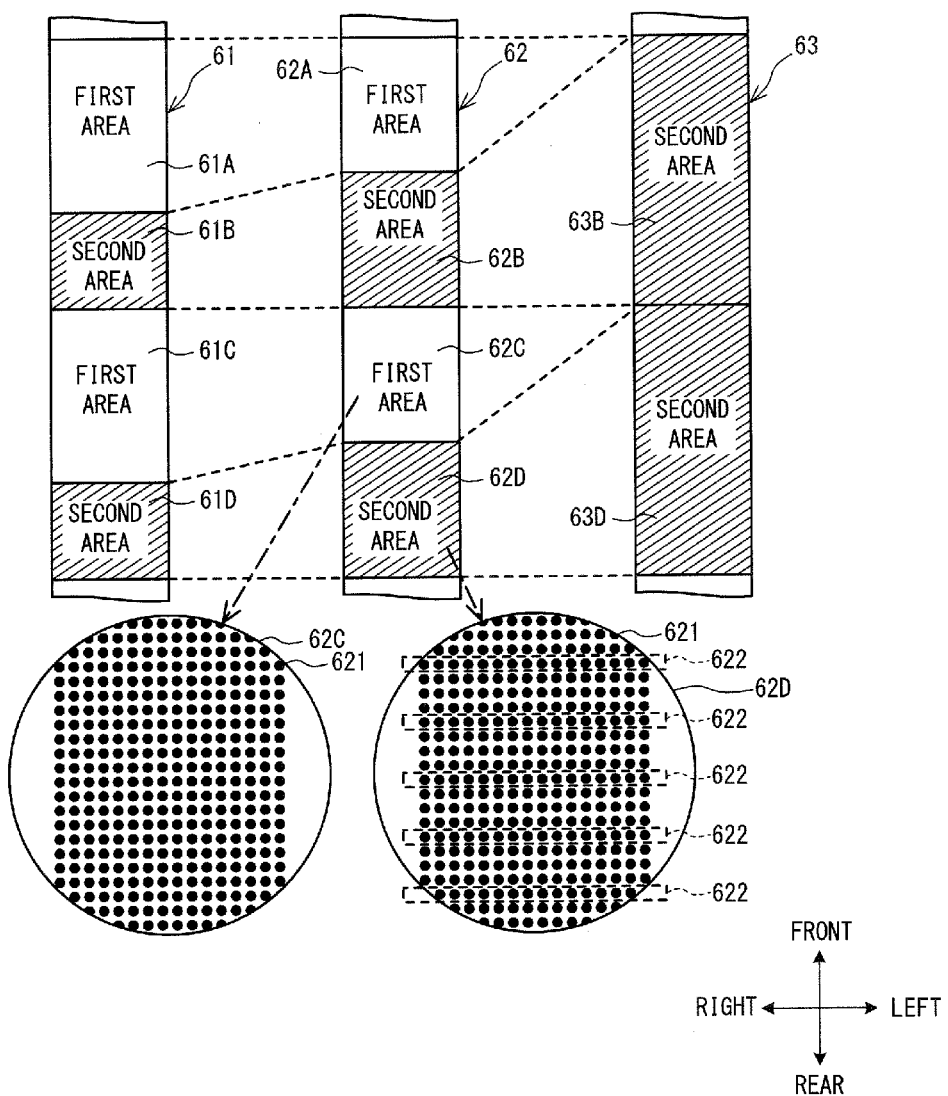
FIG. 18 is a diagram showing color ink images.

FIG. 18 shows a state in which pixel arrays not formed using the multi-pass method and pixel arrays formed using the multi-pass method are mixed together in color ink images 61 to 63. The color ink images 61 to 63 are divided into first areas and second areas. Each of the first areas is an area in which the percentage of a number of the pixel arrays formed using the multi-pass method with respect to a total number of the pixel arrays is less than 25%. Each of the second areas is an area in which the percentage of the number of the pixel arrays formed using the multi-pass method with respect to the total number of the pixel arrays is equal to or greater than 25%. The image quality of the second area is more favorable than the image quality of the first area. The reason for this is that the percentage of the pixel arrays formed using the multi-pass method is larger in the second area than in the first area. However, the greater the percentage of the pixel arrays formed using the multi-pass method, the longer the time required to form the color ink image 62.

The color ink image 62 is formed when the color ink is ejected from the nozzles 36 under the conditions of the present embodiment, in which N1 is 360. The color ink image 62 includes first areas 62A and 62C, and second areas 62B and 62D. The first areas and second areas are arranged alternately with each other. For example, only pixel arrays 621 that are not formed using the multi-pass method are arranged in the first area 62C, and pixel arrays formed using the multi-pass method are not mixed in. On the other hand, for example, in the second area 62D, there is mixing at a ratio of a single pixel array 622 formed using the multi-pass method in relation to three pixel arrays 621 not formed using the multi-pass method. In this case, the percentage of the number of pixel arrays formed using the multi-pass method with respect to the total number of the pixel arrays is 1/(3+1)=0.25 (25%).

In the color ink image 62, there is a case in which stripes occur in boundary sections between the first areas 62A and 62C, and the second areas 62B and 62D. When the stripes occur, it is possible that image quality of the color ink image 62 may deteriorate. For that reason, it is preferable that there are no boundary sections between the first areas 62A and 62C, and the second areas 62B and 62D.

Lengths in the sub scan direction of first areas 61A and 61C of the color ink image 61 are longer than lengths in the sub scan direction of the first areas 62A and 62C of the color ink image 62. Further, lengths in the sub scan direction of second areas 61B and 61D of the color ink image 61 are shorter than lengths in the sub scan direction of the second areas 62B and 62D of the color ink image 62. The color ink image 61 is formed when the color ink is ejected from the nozzles 36 under conditions in which the value of N1 is set to be larger than 360. As described above, the larger the value of N1, the smaller the percentage of the second areas with respect to the first areas. Note that, as described above, the image quality of the second areas is more favorable than the image quality of the first areas. Thus, the image quality of the color ink image 61 may deteriorate more than the image quality of the color ink image 62.

Areas of the color ink image 63 are all second areas 63B and 63D. The color ink image 63 is formed when the color ink is ejected from the nozzles 36 under conditions in which N1 is set to be 336, which is smaller than 360. The second areas, which have the more favorable image quality than the first areas, occupy all the areas of the color ink image 63. Further, the boundary sections between the first areas and second areas do not exist in the color ink image 63. As a result, the image quality of the color ink image 63 may be more improved than the image quality of the color ink images 61 and 62.

The values of N1 and N2 when forming the color ink image are calculated based on the following computation expressions. Below, a value calculated by R×D is denoted by k. k indicates a relationship between the resolution R and the distance D between each of the nozzles 36. In the case of the above-described embodiment, the following is calculated: k=R×D=1200 (dpi)×1/300 (inch)=4. The calculated k indicates that the distance between each of the nozzles 36 is 4 times the distance between the dots that are adjacent to each other in the sub scan direction in the ink image. An area in which the percentage of the number of pixel arrays formed using the multi-pass method with respect to the total number of pixel arrays is equal to or greater than n/k, is defined as the second area. Specifically, the second area corresponds to an area in which, with respect to a k number of pixel arrays, a number of pixel arrays equal to or greater than a number n are formed using the multi-pass method. In the above explanation, the second area is defined by the conditions n=1 and k=4. Thus, in the second area, of the k (=4) pixel arrays, the percentage of the number n (=1) pixel arrays formed using the multi-pass method is n/k=1/4=0.25 (25%).

In the second area, of the k pixel arrays, the n pixel arrays are printed using the multi-pass method. Thus, in order to form the second area, main scans are performed a "k+n" number of times. Therefore, N1 is calculated by multiplying a ratio of the k pixel arrays with respect to the number of main scans "k+n," namely "k/(k+n)," by the total number N of the nozzles 36 included in the ejection heads 35.

$$N1=N/(k+n)\times k$$

Further, since N2 is calculated by subtracting N1 from N, the following relational expressions are obtained.

$$N2=N-N1=N-(N/(k+n)\times k)=N/(k+n)\times n$$

In the case of the color ink image 63, N=420, K=4, and n=1, so N1 and N2 are calculated in the following manner:

$$N1=N/(k+n)\times k=420/(4+1)\times 4=336$$

$$N2=N/(k+n)\times n=420/(4+1)\times 1=84$$

The CPU 40 forms the color ink image 63 by ejecting the color ink from the nozzles 36 based on the conditions of N1 (=336) and N2 (=84) calculated on the basis of the above-described computation expressions. Thus, it is possible to make all of the areas of the color ink image 63 be the second areas in which the percentage of the pixel arrays formed using the multi-pass method is equal to or greater than n/k (=25%). The image quality of the second area is more favorable than the image quality of the first area, and the CPU 40 can form the color ink image 63 having the favorable image quality by performing the ejection control of the color ink using these conditions. Further, in the color ink image 63, there is no boundary section between the first area and the second area. As a result, the CPU 40 can suppress the occurrence of stripes between the first area and the second area, and can thus cause the boundary section to be less conspicuous.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. An image formation device comprising:
a head provided with a plurality of first nozzle holes configured to eject a first ink, and a plurality of second nozzle holes configured to eject a second ink, the plurality of second nozzle holes being arranged to a side in a sub scan direction with respect to the plurality of first nozzle holes, the head being configured to form a first ink image and a second ink image on a print medium, by moving relative to the print medium in a main scan direction, ejecting the first ink from the plurality of first nozzle holes, ejecting the second ink from the plurality of second nozzle holes, and moving relative to the print medium in the sub scan direction, the main scan direction being orthogonal to the sub scan direction;
a first storage portion storing a first mask pattern configured to identify a position onto which the second ink is ejected;
a processor; and
a memory storing computer-readable instructions, wherein the computer-readable instructions cause the processor to perform processes comprising:
a first process of ejection processing ejecting the first ink from a first predetermined number of the first nozzle holes and the second ink from the first predetermined number and a second predetermined number of the second nozzle holes while relatively moving the head in the main scan direction, the main scan direction having a position onto which the second ink is ejected in the first process of ejection processing, the position being identified by the first mask pattern;
a first process of movement processing relatively moving the head in the sub scan direction by a first distance from a position of the head at a time of completing the first process of ejection processing, the first distance being a non-integral multiple of a distance between the adjacent first nozzle holes;
a second process of ejection processing ejecting, after the first process of movement processing, the second ink from the first predetermined number and the second predetermined number of the second nozzle holes while relative moving the head in the main scan direction;

a second process of movement processing relatively moving, after the second process of ejection processing, the head in the sub scan direction by a second distance from the position of the head at the time of completing the first process of ejection processing, the second distance being a length in the sub scan direction of a section over which the first predetermined number of the first nozzle holes are arranged; and a third process of ejection processing ejecting, after the second process of movement processing, the first ink from the first predetermined number of the first nozzle holes and the second ink from the first predetermined number and the second predetermined number of the second nozzle holes while relatively moving the head in the main scan direction, an added amount, which is obtained by adding an ink amount of the second ink ejected onto a first common position in the third process of ejection processing to an ink amount of the second ink ejected onto the first common position in the first process of ejection processing, corresponding to an ink amount of the second ink ejected in the second process of ejection processing, and the first common position being a position at which an ejection position of the second ink in the first process of ejection processing and an ejection position of the second ink in the third process of ejection processing are common in the sub scan direction, the main scan direction having a position onto which the second ink is ejected in the third process of ejection processing being identified by the first mask pattern, the position in the main scan direction when the second ink is ejected by the third process of ejection processing onto the first common position being different from the position in the main scan direction when the second ink is ejected by the first process of ejection processing onto the first common position, on the basis of the first mask pattern.

2. The image formation device according to claim 1, further comprising:

a second storage portion storing a second mask pattern configured to identify a position in the main scan direction onto which the first ink is ejected in the first process of ejection processing, and a position in the main scan direction onto which the first ink is ejected in the third process of ejection processing;

wherein the processor causes, in the first process of ejection processing, the second process of ejection processing, and the third process of ejection processing, the first ink to be ejected from the first predetermined number and the second predetermined number of the first nozzle holes, and the second ink to be ejected from the first predetermined number and the second predetermined number of the second nozzle holes, and the processor causes a number of ejections corresponding to each of the first nozzle holes when, in the first process of ejection processing, the first ink is ejected from the plurality of first nozzle holes a plurality of times onto a second common position, and a number of ejections corresponding to each of the first nozzle holes when, in the third process of ejection processing, the first ink is ejected from the plurality of first nozzle holes a plurality of times onto the second common position to be different, on the basis of the second mask pattern, the second common position being a position at which an ejection position of the first ink in the first process of ejection processing and an ejection position of the first ink in the third process of ejection processing are common in the sub scan direction.

3. The image formation device according to claim 2, wherein the processor causes a ratio between a number of ejections of the second ink in the first process of ejection processing performed on the basis of the first mask pattern and a number of ejections of the second ink in the third process of ejection processing performed on the basis of the first mask pattern to change in accordance with an order in which the plurality of second nozzle holes are aligned, and the processor causes a ratio between a number of ejections of the first ink in the first process of ejection processing performed on the basis of the second mask pattern and a number of ejections of the first ink in the third process of ejection processing performed on the basis of the second mask pattern to be constant.

4. The image formation device according to claim 1, wherein the head is configured to eject a white ink as the first ink and to eject a color ink as the second ink.

5. The image formation device according to claim 1, wherein the plurality of first nozzle holes are arranged at an equal interval in the sub scan direction, and the plurality of second nozzle holes are arranged at an equal interval in the sub scan direction.

6. The image formation device according to claim 1, wherein the computer-readable instructions further cause the processor to perform setting the added amount to be same as the ink amount of the second ink ejected by the second ejection.

7. The image formation device according to claim 1, wherein the first ink is different from the second ink.

8. A non-transitory computer-readable medium storing computer-readable instructions that are executed by a processor provided in an image formation device including a head and a storage portion, the head being provided with a plurality of first nozzle holes configured to eject a first ink, and a plurality of second nozzle holes configured to eject a second ink, and the plurality of second nozzle holes being arranged to a side in a sub scan direction with respect to the plurality of first nozzle holes, the head being configured to form a first ink image and a second ink image on a print medium, by moving relative to the print medium in a main scan direction, ejecting the first ink from the plurality of first nozzle holes and ejecting the second ink from the plurality of second nozzle holes, and moving relative to the print medium in the sub scan direction, the main scan direction being orthogonal to the sub scan direction, the storage portion storing a mask pattern configured to identify a position onto which the second ink is ejected, the computer-readable instructions performing processes comprising:

a first process of ejection processing ejecting the first ink from a first predetermined number of the first nozzle holes and the second ink from the first predetermined number and a second predetermined number of the second nozzle holes while relatively moving the head in the main scan direction, the main scan direction having a position onto which the second ink is ejected in the first process of ejection processing, the position being identified by the first mask pattern;
a first process of movement processing relatively moving the head in the sub scan direction by a first distance from a position of the head at a time of completing the first process of ejection processing, the first distance being a non-integral multiple of a distance between the adjacent first nozzle holes;
a second process of ejection processing ejecting, after the first process of movement processing, the second ink from the first predetermined number and the second predetermined number of the second nozzle holes while relative moving the head in the main scan direction;
a second process of movement processing relatively moving, after the second process of ejection processing, the head in the sub scan direction by a second distance from the position of the head at the time of completing the first process of ejection processing, the second distance being a length in the sub scan direction of a section over which the first predetermined number of the first nozzle holes are arranged; and
a third process of ejection processing ejecting, after the second process of movement processing, the first ink from the first predetermined number of the first nozzle holes and the second ink from the first predetermined number and the second predetermined number of the second nozzle holes while relatively moving the head in the main scan direction, an added amount, which is obtained by adding an ink amount of the second ink ejected onto a first common position in the third process of ejection processing to an ink amount of the second ink ejected onto the first common position in the first process of ejection processing, corresponding to an ink amount of the second ink ejected in the second process of ejection processing, and the first common position being a position at which an ejection position of the second ink in the first process of ejection processing and an ejection position of the second ink in the third process of ejection processing are common in the sub scan direction, the main scan direction having a position onto which the second ink is ejected in the third process of ejection processing being identified by the mask pattern, the position in the main scan direction when the second ink is ejected by the third process of ejection processing onto the first common position being different from the position in the main scan direction when the second ink is ejected by the first process of ejection processing onto the first common position, on the basis of the mask pattern.

9. The image formation device according to claim 8, wherein
the first ink is different from the second ink.

10. An image formation device comprising:
a head provided with a plurality of first nozzle holes configured to eject a first ink, and a plurality of second nozzle holes configured to eject a second ink, the plurality of second nozzle holes being arranged to a side in a sub scan direction with respect to the plurality of first nozzle holes, the head being configured to form a first ink image and a second ink image on a print medium, by moving relative to the print medium in a main scan direction, ejecting the first ink from the plurality of first nozzle holes, ejecting the second ink from the plurality of second nozzle holes, and moving relative to the print medium in the sub scan direction, the main scan direction being orthogonal to the sub scan direction;
a processor; and
a memory storing computer-readable instructions, wherein the computer-readable instructions cause the processor to perform processes comprising:
a first process of ejection processing ejecting the first ink from a first predetermined number of the first nozzle holes and the second ink from the first predetermined number and a second predetermined number of the second nozzle holes while relatively moving the head in the main scan direction, the second ink being ejected while changing a number of ejections corresponding to each of the second nozzle holes in accordance with an order in which the plurality of second nozzle holes are aligned when the second ink is ejected from the plurality of second nozzle holes a plurality of times onto a first common position;
a first process of movement processing relatively moving the head in the sub scan direction by a first distance from a position of the head at a time of completing the first process of ejection processing, the first distance being a non-integral multiple of a distance between the adjacent first nozzle holes;
a second process of ejection processing ejecting, after the first process of movement processing, the second ink from the first predetermined number and the second predetermined number of the second nozzle holes while relative moving the head in the main scan direction;
a second process of movement processing relatively moving, after the second process of ejection processing, the head in the sub scan direction by a second distance from the position of the head at the time of completing the first process of ejection processing, the second distance being a length in the sub scan direction of a section over which the first predetermined number of the first nozzle holes are arranged; and
a third process of ejection processing ejecting, after the second process of movement processing, the first ink from the first predetermined number of the first nozzle holes and the second ink from the first predetermined number and the second predetermined number of the second nozzle holes while relatively moving the head in the main scan direction, the second ink being ejected while changing a number of ejections corresponding to each of the second nozzle holes in accordance with the order in which the plurality of second nozzle holes are aligned when the second ink is ejected from the plurality of second nozzle holes a plurality of times onto the first common position, an added amount, which is obtained by adding an ink amount of the second ink ejected onto the first common position in the third process of ejection processing to an ink amount of the second ink ejected onto the first common position in the first process of ejection processing, corresponding to an ink amount of the second ink ejected in the second process of ejection processing, and the first common position being a position at which an ejection position of the second ink in the first process of ejection processing and an ejection position of the second ink in the third process of ejection processing are common in the sub scan direction.

11. The image formation device according to claim 10, wherein
the first ink is different from the second ink.

12. An image formation device comprising:
a head provided with a plurality of first nozzle holes configured to eject a first ink, and a plurality of second nozzle holes configured to eject a second ink, the plurality of second nozzle holes being arranged to a side in a sub scan direction with respect to the plurality of first nozzle holes, the head being configured to form a first ink image and a second ink image on a print medium, by moving relative to the print medium in a main scan direction, ejecting the first ink from the plurality of first nozzle holes, ejecting the second ink from the plurality of second nozzle holes, and moving relative to the print medium in the sub scan direction, the main scan direction being orthogonal to the sub scan direction;
a processor; and
a memory storing computer-readable instructions, wherein the computer-readable instructions cause the processor to perform processes comprising:
 a first process of ejection processing ejecting the first ink from a first predetermined number of the first nozzle holes and the second ink from the first predetermined number and a second predetermined number of the second nozzle holes while relatively moving the head in the main scan direction, the first predetermined number, which is N1, of the first nozzle holes and the second predetermined number, which is N2, of the second nozzle holes being aligned, at respective intervals of D [inch] in the sub scan direction, and, when the second ink image having a resolution R [dpi] being formed, expressions at end being satisfied;
 a first process of movement processing relatively moving the head in the sub scan direction by a first distance from a position of the head at a time of completing the first process of ejection processing, the first distance being a non-integral multiple of a distance between the adjacent first nozzle holes;
 a second process of ejection processing ejecting, after the first process of movement processing, the second ink from the first predetermined number and the second predetermined number of the second nozzle holes while relative moving the head in the main scan direction;
 a second process of movement processing relatively moving, after the second process of ejection processing, the head in the sub scan direction by a second distance from the position of the head at the time of completing the first process of ejection processing, the second distance being a length in the sub scan direction of a section over which the first predetermined number of the first nozzle holes are arranged; and
 a third process of ejection processing ejecting, after the second process of movement processing, the first ink from the first predetermined number of the first nozzle holes and the second ink from the first predetermined number and the second predetermined number of the second nozzle holes while relatively moving the head in the main scan direction, an added amount, which is obtained by adding an ink amount of the second ink ejected onto a first common position in the third process of ejection processing to an ink amount of the second ink ejected onto the first common position in the first process of ejection processing, corresponding to an ink amount of the second ink ejected in the second process of ejection processing, and the first common position being a position at which an ejection position of the second ink in the first process of ejection processing and an ejection position of the second ink in the third process of ejection processing are common in the sub scan direction;

$N=N1+N2$ $N1=N/((R\times D)+n)\times(R\times D)$ $N2=N/((R\times D)+n)\times n$ N: the total number of the nozzle holes
N1: the first predetermined number
N2: the second predetermined number
D: a distance [inch] between the nozzle holes
R: the resolution [dpi]
n: an integer.

13. The image formation device according to claim 12, wherein
the first ink is different from the second ink.

* * * * *